(12) United States Patent
Tanada

(10) Patent No.: US 9,261,943 B2
(45) Date of Patent: Feb. 16, 2016

(54) SEMICONDUCTOR DEVICE AND DRIVING METHOD THEREOF

(71) Applicant: Semiconductor Energy Laboratory Co., Ltd., Atsugi-shi, Kanagawa-ken (JP)

(72) Inventor: Yoshifumi Tanada, Gifu (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 275 days.

(21) Appl. No.: 13/874,573

(22) Filed: May 1, 2013

(65) Prior Publication Data

US 2013/0297956 A1 Nov. 7, 2013

(30) Foreign Application Priority Data

May 2, 2012 (JP) .................. 2012-105114

(51) Int. Cl.
*G06F 1/32* (2006.01)
*G06F 13/40* (2006.01)
*G06F 9/30* (2006.01)

(52) U.S. Cl.
CPC ............ *G06F 1/3234* (2013.01); *G06F 1/32* (2013.01); *G06F 1/3243* (2013.01); *G06F 1/3253* (2013.01); *G06F 9/30079* (2013.01); *G06F 9/30083* (2013.01); *G06F 13/4068* (2013.01); *Y02B 60/1235* (2013.01); *Y02B 60/1239* (2013.01)

(58) Field of Classification Search
CPC ........ G06F 1/3234; G06F 1/3243; G06F 1/32
USPC ........................................... 713/320
See application file for complete search history.

(56) References Cited

U.S. PATENT DOCUMENTS

| | | |
|---|---|---|
| 5,731,856 A | 3/1998 | Kim et al. |
| 5,744,864 A | 4/1998 | Cillessen et al. |
| 6,294,274 B1 | 9/2001 | Kawazoe et al. |

(Continued)

FOREIGN PATENT DOCUMENTS

| | | |
|---|---|---|
| EP | 1 737 044 A1 | 12/2006 |
| EP | 2 226 847 A2 | 9/2010 |

(Continued)

OTHER PUBLICATIONS

Ohara, H et al., "Amorphous In—Ga—Zn—Oxide TFTs with Suppressed Variation for 4.0 inch QVGA AMOLED Display," AM-FPD '09 Digest of Technical Papers, Jul. 1, 2009, pp. 227-230, The Japan Society of Applied Physics.

(Continued)

*Primary Examiner* — Vincent Tran
(74) *Attorney, Agent, or Firm* — Fish & Richardson P.C.

(57) ABSTRACT

A semiconductor device which can consume less power and a method for driving the semiconductor device can be provided. The semiconductor device includes a processor including a control device and an arithmetic unit, a memory device, an input/output device, and a plurality of bus lines which is a path for transmitting and receiving instructions, addresses, or data between the processor and the memory device, or the processor and the input/output device. A first memory storing each piece of information over the bus line is connected to each of the bus lines, and a second memory storing a status flag relating to information over the bus line is connected to the control device.

20 Claims, 8 Drawing Sheets

(56) References Cited

U.S. PATENT DOCUMENTS

| | | | |
|---|---|---|---|
| 6,563,174 B2 | 5/2003 | Kawasaki et al. | |
| 6,727,522 B1 | 4/2004 | Kawasaki et al. | |
| 6,839,774 B1* | 1/2005 | Ahn et al. | 710/14 |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |
| 7,105,868 B2 | 9/2006 | Nause et al. | |
| 7,211,825 B2 | 5/2007 | Shih et al | |
| 7,282,782 B2 | 10/2007 | Hoffman et al. | |
| 7,297,977 B2 | 11/2007 | Hoffman et al. | |
| 7,323,356 B2 | 1/2008 | Hosono et al. | |
| 7,385,224 B2 | 6/2008 | Ishii et al. | |
| 7,402,506 B2 | 7/2008 | Levy et al. | |
| 7,411,209 B2 | 8/2008 | Endo et al. | |
| 7,453,065 B2 | 11/2008 | Saito et al. | |
| 7,453,087 B2 | 11/2008 | Iwasaki | |
| 7,462,862 B2 | 12/2008 | Hoffman et al. | |
| 7,468,304 B2 | 12/2008 | Kaji et al. | |
| 7,501,293 B2 | 3/2009 | Ito et al. | |
| 7,674,650 B2 | 3/2010 | Akimoto et al. | |
| 7,732,819 B2 | 6/2010 | Akimoto et al. | |
| 8,724,407 B2* | 5/2014 | Kobayashi et al. | 365/189.2 |
| 2001/0046027 A1 | 11/2001 | Tai et al. | |
| 2002/0056838 A1 | 5/2002 | Ogawa | |
| 2002/0132454 A1 | 9/2002 | Ohtsu et al. | |
| 2003/0189401 A1 | 10/2003 | Kido et al. | |
| 2003/0218222 A1 | 11/2003 | Wager, III et al. | |
| 2004/0038446 A1 | 2/2004 | Takeda et al. | |
| 2004/0127038 A1 | 7/2004 | Carcia et al. | |
| 2005/0017302 A1 | 1/2005 | Hoffman | |
| 2005/0199959 A1 | 9/2005 | Chiang et al. | |
| 2006/0035452 A1 | 2/2006 | Carcia et al. | |
| 2006/0043377 A1 | 3/2006 | Hoffman et al. | |
| 2006/0091793 A1 | 5/2006 | Baude et al. | |
| 2006/0108529 A1 | 5/2006 | Saito et al. | |
| 2006/0108636 A1 | 5/2006 | Sano et al. | |
| 2006/0110867 A1 | 5/2006 | Yabuta et al. | |
| 2006/0113536 A1 | 6/2006 | Kumomi et al. | |
| 2006/0113539 A1 | 6/2006 | Sano et al. | |
| 2006/0113549 A1 | 6/2006 | Den et al. | |
| 2006/0113565 A1 | 6/2006 | Abe et al. | |
| 2006/0169973 A1 | 8/2006 | Isa et al. | |
| 2006/0170111 A1 | 8/2006 | Isa et al. | |
| 2006/0197092 A1 | 9/2006 | Hoffman et al. | |
| 2006/0208977 A1 | 9/2006 | Kimura | |
| 2006/0228974 A1 | 10/2006 | Thelss et al. | |
| 2006/0231882 A1 | 10/2006 | Kim et al. | |
| 2006/0238135 A1 | 10/2006 | Kimura | |
| 2006/0244107 A1 | 11/2006 | Sugihara et al. | |
| 2006/0284171 A1 | 12/2006 | Levy et al. | |
| 2006/0284172 A1 | 12/2006 | Ishii | |
| 2006/0292777 A1 | 12/2006 | Dunbar | |
| 2007/0024187 A1 | 2/2007 | Shin et al. | |
| 2007/0046191 A1 | 3/2007 | Saito | |
| 2007/0052025 A1 | 3/2007 | Yabuta | |
| 2007/0054507 A1 | 3/2007 | Kaji et al. | |
| 2007/0090365 A1 | 4/2007 | Hayashi et al. | |
| 2007/0108446 A1 | 5/2007 | Akimoto | |
| 2007/0152217 A1 | 7/2007 | Lai et al. | |
| 2007/0172591 A1 | 7/2007 | Seo et al. | |
| 2007/0187678 A1 | 8/2007 | Hirao et al. | |
| 2007/0187760 A1 | 8/2007 | Furuta et al. | |
| 2007/0194379 A1 | 8/2007 | Hosono et al. | |
| 2007/0252928 A1 | 11/2007 | Ito et al. | |
| 2007/0272922 A1 | 11/2007 | Kim et al. | |
| 2007/0287296 A1 | 12/2007 | Chang | |
| 2008/0006877 A1 | 1/2008 | Mardilovich et al. | |
| 2008/0038882 A1 | 2/2008 | Takechi et al. | |
| 2008/0038929 A1 | 2/2008 | Chang | |
| 2008/0050595 A1 | 2/2008 | Nakagawara et al. | |
| 2008/0073653 A1 | 3/2008 | Iwasaki | |
| 2008/0083950 A1 | 4/2008 | Pan et al. | |
| 2008/0106191 A1 | 5/2008 | Kawase | |
| 2008/0128689 A1 | 6/2008 | Lee et al. | |
| 2008/0129195 A1 | 6/2008 | Ishizaki et al. | |
| 2008/0166834 A1 | 7/2008 | Kim et al. | |
| 2008/0182358 A1 | 7/2008 | Cowdery-Corvan et al. | |
| 2008/0224133 A1 | 9/2008 | Park et al. | |
| 2008/0254569 A1 | 10/2008 | Hoffman et al. | |
| 2008/0258139 A1 | 10/2008 | Ito et al. | |
| 2008/0258140 A1 | 10/2008 | Lee et al. | |
| 2008/0258141 A1 | 10/2008 | Park et al. | |
| 2008/0258143 A1 | 10/2008 | Kim et al. | |
| 2008/0296568 A1 | 12/2008 | Ryu et al. | |
| 2009/0068773 A1 | 3/2009 | Lai et al. | |
| 2009/0073325 A1 | 3/2009 | Kuwabara et al. | |
| 2009/0114910 A1 | 5/2009 | Chang | |
| 2009/0134399 A1 | 5/2009 | Sakakura et al. | |
| 2009/0152506 A1 | 6/2009 | Umeda et al. | |
| 2009/0152541 A1 | 6/2009 | Maekawa et al. | |
| 2009/0278122 A1 | 11/2009 | Hosono et al. | |
| 2009/0280600 A1 | 11/2009 | Hosono et al. | |
| 2010/0065844 A1 | 3/2010 | Tokunaga | |
| 2010/0092800 A1 | 4/2010 | Itagaki et al. | |
| 2010/0109002 A1 | 5/2010 | Itagaki et al. | |
| 2011/0121878 A1 | 5/2011 | Kato et al. | |
| 2011/0148463 A1 | 6/2011 | Kato et al. | |
| 2011/0187410 A1 | 8/2011 | Kato et al. | |
| 2012/0124316 A1* | 5/2012 | Gunasekar | 711/166 |
| 2012/0230078 A1 | 9/2012 | Fujita | |
| 2012/0243340 A1 | 9/2012 | Kobayashi et al. | |
| 2013/0297956 A1* | 11/2013 | Tanada | 713/320 |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 10-301659 A | 11/1998 |
| JP | 11-505377 A | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| WO | 2004/114391 A1 | 12/2004 |

OTHER PUBLICATIONS

Orita, M et al., "Amorphous transparent conductive oxide InGaO3(ZnO)m (m<4):a Zn4s conductor," Philosophical Magazine, 2001, vol. 81, No. 5, pp. 501-515.

Orita, M et al., "Mechanism of Electrical Conductivity of Transparent InGaZnO4," Phys. Rev. B (Physical Review. B), Jan. 15, 2000, vol. 61, No. 3, pp. 1811-1816.

Osada, T et al., "15.2: Development of Driver-Integrated Panel using Amorphous In—Ga—Zn—Oxide TFT," SID Digest '09 : SID International Symposium Digest of Technical Papers, May 31, 2009, pp. 184-187.

Osada, T et al., "Development of Driver-Integrated Panel Using Amorphous In—Ga—Zn—Oxide TFT," AM-FPD '09 Digest of Technical Papers, Jul. 1, 2009, pp. 33-36.

Park, J et al., "Dry etching of ZnO films and plasma-induced damage to optical properties," J. Vac. Sci. Technol. B (Journal of Vacuum Science & Technology B), Mar. 1, 2003, vol. 21, No. 2, pp. 800-803.

Park, J et al., "Improvements in the Device Characteristics of Amorphous Indium Gallium Zinc Oxide Thin-Film Transistors by Ar Plasma Treatment," Appl. Phys. Lett. (Applied Physics Letters), Jun. 26, 2007, vol. 90, No. 26, pp. 262106-1-262106-3.

Park, J et al., "Electronic Transport Properties of Amorphous Indium—Gallium—Zinc Oxide Semiconductor Upon Exposure to Water," Appl. Phys. Lett. (Applied Physics Letters), 2008, vol. 92, pp. 072104-1-072104-3.

(56) References Cited

OTHER PUBLICATIONS

Park, J et al., "High performance amorphous oxide thin film transistors with self-aligned top-gate structure," IEDM 09: Technical Digest of International Electron Devices Meeting, Dec. 7, 2009, pp. 191-194.

Park, Sang-Hee et al., "42.3: Transparent ZnO Thin Film Transistor for the Application of High Aperture Ratio Bottom Emission AM-OLED Display," SID Digest '08 : SID International Symposium Digest of Technical Papers, May 20, 2008, vol. 39, pp. 629-632.

Park, J et al., "Amorphous Indium—Gallium—Zinc Oxide TFTs and Their Application for Large Size AMOLED," AM-FPD '08 Digest of Technical Papers, Jul. 2, 2008, pp. 275-278.

Park, S et al., "Challenge to Future Displays: Transparent AM-OLED Driven by Peald Grown ZnO TFT," IMID '07 Digest, 2007, pp. 1249-1252.

Prins, M et al., "A Ferroelectric Transparent Thin-Film Transistor," Appl. Phys. Lett. (Applied Physics Letters), Jun. 17, 1996, vol. 68, No. 25, pp. 3650-3652.

Sakata, J et al., "Development of 4.0-In. AMOLED Display With Driver Circuit Using Amorphous In—Ga—Zn—Oxide TFTs," IDW '09 : Proceedings of the 16th International Display Workshops, 2009, pp. 689-692.

Son, K et al., "42.4L: Late-News Paper: 4 Inch QVGA AMOLED Driven by the Threshold Voltage Controlled Amorphous GIZO (Ga2O3—In2O3—ZnO) TFT," SID Digest '08 : SID International Symposium Digest of Technical Papers, May 20, 2008, vol. 39, pp. 633-636.

Takahashi, M et al., "Theoretical Analysis of IGZO Transparent Amorphous Oxide Semiconductor," IDW '08 : Proceedings of the 15th International Display Workshops, Dec. 3, 2008, pp. 1637-1640.

Tsuda, K et al., "Ultra Low Power Consumption Technologies for Mobile TFT-LCDs," IDW '02 : Proceedings of the 9th International Display Workshops, Dec. 4, 2002, pp. 295-298.

Ueno, K et al., "Field-Effect Transistor on SrTiO3 With Sputtered Al2O3 Gate Insulator," Appl. Phys. Lett. (Applied Physics Letters), Sep. 1, 2003, vol. 83, No. 9, pp. 1755-1757.

Van De Walle, C, "Hydrogen as a Cause of Doping in Zinc Oxide," Phys. Rev. Lett. (Physical Review Letters), Jul. 31, 2000, vol. 85, No. 5, pp. 1012-1015.

Asakuma, N et al., "Crystallization and Reduction of Sol-Gel-Derived Zinc Oxide Films by Irradiation With Ultraviolet Lamp," Journal of Sol-Gel Science and Technology, 2003, vol. 26, pp. 181-184.

Asaoka, Y et al., "29.1: Polarizer-Free Reflective LCD Combined With Ultra Low-Power Driving Technology," SID Digest '09 : SID International Symposium Digest of Technical Papers, 2009, pp. 395-398.

Chern, H et al., "An Analytical Model for the Above-Threshold Characteristics of Polysilicon Thin-Film Transistors," IEEE Transactions on Electron Devices, Jul. 1, 1995, vol. 42, No. 7, pp. 1240-1246.

Cho, D et al., "21.2: Al and Sn-Doped Zinc Indium Oxide Thin Film Transistors for AMOLED Back-Plane," SID Digest '09 : SID International Symposium Digest of Technical Papers, May 31, 2009, pp. 280-283.

Clark, S et al., "First Principles Methods Using CASTEP," Zeitschrift fur Kristallographie, 2005, vol. 220, pp. 567-570.

Coates. D et al., Optical Studies of the Amorphous Liquid-Cholesteric Liquid Crystal Transition: The "Blue Phase," Physics Letters, Sep. 10, 1973, vol. 45A, No. 2, pp. 115-116.

Costello, M et al., "Electron Microscopy of a Cholesteric Liquid Crystal and Its Blue Phase," Phys. Rev. A (Physical Review. A), May 1, 1984, vol. 29, No. 5, pp. 2957-2959.

Dembo, H et al., "RFCPUS on Glass and Plastic Substrates Fabricated by TFT Transfer Technology," IEDM 05: Technical Digest of International Electron Devices Meeting, Dec. 5, 2005, pp. 1067-1069.

Fortunato, E et al., "Wide-Bandgap High-Mobility ZnO Thin-Film Transistors Produced at Room Temperature," Appl. Phys. Lett. (Applied Physics Letters), Sep. 27, 2004, vol. 85, No. 13, pp. 2541-2543.

Fung, T et al., "2-D Numerical Simulation of High Performance Amorphous In—Ga—Zn—O TFTs for Flat Panel Displays," AM-FPD '08 Digest of Technical Papers, Jul. 2, 2008, pp. 251-252, The Japan Society of Applied Physics.

Godo, H et al., "P-9: Numerical Analysis on Temperature Dependence of Characteristics of Amorphous In—Ga—Zn—Oxide TFT," SID Digest '09 : SID International Symposium Digest of Technical Papers, May 31, 2009, pp. 1110-1112.

Godo, H et al., "Temperature Dependence of Characteristics and Electronic Structure for Amorphous In—Ga—Zn—Oxide TFT," AM-FPD '09 Digest of Technical Papers, Jul. 1, 2009, pp. 41-44.

Hayashi, R et al., "42.1: Invited Paper: Improved Amorphous In—Ga—Zn—O TFTs," SID Digest '08 : SID International Symposium Digest of Technical Papers, May 20, 2008, vol. 39, pp. 621-624.

Hirao, T et al., "Novel Top-Gate Zinc Oxide Thin-Film Transistors (ZnO TFTs) for AMLCDs," Journal of the SID , 2007, vol. 15, No. 1, pp. 17-22.

Hosono, H et al., "Working hypothesis to explore novel wide band gap electrically conducting amorphous oxides and examples," J. Non-Cryst. Solids (Journal of Non-Crystalline Solids), 1996, vol. 198-200, pp. 165-169.

Hosono, H, "68.3: Invited Paper:Transparent Amorphous Oxide Semiconductors for High Performance TFT," SID Digest '07 : SID International Symposium Digest of Technical Papers, 2007, vol. 38, pp. 1830-1833.

Hsieh, H et al., "P-29: Modeling of Amorphous Oxide Semiconductor Thin Film Transistors and Subgap Density of States," SID Digest '08 : SID International Symposium Digest of Technical Papers, 2008, vol. 39, pp. 1277-1280.

Ikeda, T et al., "Full-Functional System Liquid Crystal Display Using CG-Silicon Technology," SID Digest '04 : SID International Symposium Digest of Technical Papers, 2004, vol. 35, pp. 860-863.

Janotti, A et al., "Native Point Defects in ZnO," Phys. Rev. B (Physical Review. B), 2007, vol. 76, No. 16, pp. 165202-1-165202-22.

Janotti, A et al., "Oxygen Vacancies in ZnO," Appl. Phys. Lett. (Applied Physics Letters), 2005, vol. 87, pp. 122102-1-122102-3.

Jeong, J et al., "3.1: Distinguished Paper: 12.1-Inch WXGA AMOLED Display Driven by Indium—Gallium—Zinc Oxide TFTs Array," SID Digest '08 : SID International Symposium Digest of Technical Papers, May 20, 2008, vol. 39, No. 1, pp. 1-4.

Jin, D et al., "65.2: Distinguished Paper:World-Largest (6.5") Flexible Full Color Top Emission AMOLED Display on Plastic Film and Its Bending Properties," SID Digest '09 : SID International Symposium Digest of Technical Papers, May 31, 2009, pp. 983-985.

Kanno, H et al., "White Stacked Electrophosphorecent Organic Light-Emitting Devices Employing MOO3 as a Charge-Generation Layer," Adv. Mater. (Advanced Materials), 2006, vol. 18, No. 3, pp. 339-342.

Kikuchi, H et al., "39.1: Invited Paper: Optically Isotropic Nano-Structured Liquid Crystal Composites for Display Applications," SID Digest '09 : SID International Symposium Digest of Technical Papers, May 31, 2009, pp. 578-581.

Kikuchi, H et al., "62.2: Invited Paper: Fast Electro-Optical Switching in Polymer-Stabilized Liquid Crystalline Blue Phases for Display Application," SID Digest '07 : SID International Symposium Digest of Technical Papers, 2007, vol. 38, pp. 1737-1740.

Kikuchi, H et al., "Polymer-Stabilized Liquid Crystal Blue Phases," Nature Materials, Sep. 1, 2002, vol. 1, pp. 64-68.

Kim, S et al., "High-Performance oxide thin film transistors passivated by various gas plasmas," The Electrochemical Society, 214th ECS Meeting, 2008, No. 2317, 1 page.

Kimizuka, N et al., "Spinel,YbFe2O4, and Yb2Fe3O7 Types of Structures for Compounds in the In2O3 and Sc2O3—A2O3—BO Systems [A; Fe, Ga, or Al; B: Mg, Mn, Fe, Ni, Cu,or Zn] at Temperatures Over 1000° C.," Journal of Solid State Chemistry, 1985, vol. 60, pp. 382-384.

Kimizuka, N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System," Journal of Solid State Chemistry, Apr. 1, 1995, vol. 116, No. 1, pp. 170-178.

Kitzerow, H et al., "Observation of Blue Phases in Chiral Networks," Liquid Crystals, 1993, vol. 14, No. 3, pp. 911-916.

(56) References Cited

OTHER PUBLICATIONS

Kurokawa, Y et al., "UHF RFCPUS on Flexible and Glass Substrates for Secure RFID Systems," Journal of Solid-State Circuits, 2008, vol. 43, No. 1, pp. 292-299.

Lany, S et al., "Dopability, Intrinsic Conductivity, and Nonstoichiometry of Transparent Conducting Oxides," Phys. Rev. Lett. (Physical Review Letters), Jan. 26, 2007, vol. 98, pp. 045501-1-045501-4.

Lee, H et al., "Current Status of, Challenges to, and Perspective View of AM-OLED," IDW '06 : Proceedings of the 13th International Display Workshops, Dec. 7, 2006, pp. 663-666.

Lee, J et al., "World's Largest (15-Inch) XGA AMLCD Panel Using IGZO Oxide TFT," SID Digest '08 : SID International Symposium Digest of Technical Papers, May 20, 2008, vol. 39, pp. 625-628.

Lee, M et al., "15.4: Excellent Performance of Indium—Oxide-Based Thin-Film Transistors by DC Sputtering," SID Digest '09 : SID International Symposium Digest of Technical Papers, May 31, 2009, pp. 191-193.

Li, C et al "Modulated Structures of Homologous Compounds InMO3(ZnO)m (M=In,Ga; m=Integer) Described by Four-Dimensional Superspace Group," Journal of Solid State Chemistry, 1998, vol. 139, pp. 347-355.

Masuda, S et al., "Transparent thin film transistors using ZnO as an active channel layer and their electrical properties," J. Appl. Phys. (Journal of Applied Physics), Feb. 1, 2003, vol. 93, No. 3, pp. 1624-1630.

Meiboom, S et al., "Theory of the Blue Phase of Cholesteric Liquid Crystals," Phys. Rev. Lett. (Physical Review Letters), May 4, 1981, vol. 46, No. 18, pp. 1216-1219.

Miyasaka, M, "Suftla Flexible Microelectronics on Their Way to Business," SID Digest '07 : SID International Symposium Digest of Technical Papers, 2007, vol. 38, pp. 1673-1676.

Mo, Y et al., "Amorphous Oxide TFT Backplanes for Large Size AMOLED Displays," IDW '08 : Proceedings of the 6th International Display Workshops, Dec. 3, 2008, pp. 581-584.

Nakamura, "Synthesis of Homologous Compound with New Long-Period Structure," NIRIM Newsletter, Mar. 1995, vol. 150, pp. 1-4 with English translation.

Nakamura, M et al., "The phase relations in the In2O3—Ga2ZnO4—ZnO system at 1350° C.," Journal of Solid State Chemistry, Aug. 1, 1991, vol. 93, No. 2, pp. 298-315.

Nomura, K et al., "Thin-Film Transistor Fabricated in Single-Crystalline Transparent Oxide Semiconductor," Science, May 23, 2003, vol. 300, No. 5623, pp. 1269-1272.

Nomura, K et al., "Amorphous Oxide Semiconductors for High-Performance Flexible Thin-Film Transistors," Jpn. J. Appl. Phys. (Japanese Journal of Applied Physics), 2006, vol. 45, No. 5B, pp. 4303-4308.

Nomura, K et al., "Room-Temperature Fabrication of Transparent Flexible Thin-Film Transistors Using Amorphous Oxide Semiconductors," Nature, Nov. 25, 2004, vol. 432, pp. 488-492.

Nomura, K et al., "Carrier transport in transparent oxide semiconductor with intrinsic structural randomness probed using single-crystalline InGaO3(ZnO)5 films," Appl. Phys. Lett. (Applied Physics Letters), Sep. 13, 2004, vol. 85, No. 11, pp. 1993-1995.

Nowatari, H et al., "60.2: Intermediate Connector With Suppressed Voltage Loss for White Tandem OLEDs," SID Digest '09 : SID International Symposium Digest of Technical Papers, May 31, 2009, vol. 40, pp. 899-902.

Oba, F et al., "Defect energetics in ZnO: A hybrid Hartree-Fock density functional study," Phys. Rev. B (Physical Review. B), 2008, vol. 77, pp. 245202-1-245202-6.

Oh, M et al., "Improving the Gate Stability of ZnO Thin-Film Transistors With Aluminum Oxide Dielectric Layers," J. Electrochem. Soc. (Journal of the Electrochemical Society), 2008, vol. 155, No. 12, pp. H1009-H1014.

Ohara, H et al., "21.3: 4.0 In. QVGA AMOLED Display Using In—Ga—Zn—Oxide TFTs With a Novel Passivation Layer," SID Digest '09 : SID International Symposium Digest of Technical Papers, May 31, 2009, pp. 284-287.

\* cited by examiner

SEMICONDUCTOR DEVICE AND DRIVING METHOD THEREOF

BACKGROUND OF THE INVENTION

1. Field of the Invention

The present invention relates to an object, a method, or a manufacturing method. Further, the present invention relates to a process, a machine, manufacture, or a composition of matter. In particular, the present invention relates to, for example, a semiconductor device, a display device, a light-emitting device, a power storage device, a driving method thereof, or a manufacturing method thereof. In particular, the present invention relates to a semiconductor device including a memory device and a driving method of the semiconductor device.

2. Description of the Related Art

With miniaturization of a semiconductor element, operation speed and integration degree of a semiconductor device are improved; therefore, a processor such as a central processing unit (CPU) which has high processing ability has been manufactured. On the other hand, the amount of power consumption due to leakage current of the miniaturized and highly integrated semiconductor element has increased; therefore, it is an important object to reduce power consumption of a processor.

Thus, a technique called normally off computing attracts attention, in which the power consumption of a processor is reduced by stopping power supply for an integrated circuit which is not used. For example, in Patent Document 1, a method for stopping supply of power supply voltage to an integrated circuit which does not need to operate is disclosed.

REFERENCE

Patent Document

[Patent Document 1] Japanese Published Patent Application No. H10-301659

SUMMARY OF THE INVENTION

In an integrated circuit in which power supply is stopped, the moment the power supply is stopped logic of all nodes in the integrated circuit is volatilized; therefore, timing of stopping the power supply is limited to after the complete finish of processing. On the other hand, in the case where a register, a cache memory, or the like in the integrated circuit is nonvolatile, even in the middle of processing, a certain amount of information can be held after the power supply is stopped.

However, an occupied area by the register or the cache memory in the integrated circuit is large; therefore, new problems such as a further increase in circuit area and an increase in parasitic capacitance by giving non-volatility may occur.

In view of the above problems, in one embodiment of the present invention, an object is to provide a semiconductor device which can consume less power. Further, another object is to provide a method for driving the semiconductor device which can consume less power. In addition, another object is to provide a highly integrated semiconductor device. Further, another object is to provide a novel semiconductor device or the like.

Note that the descriptions of these problems do not disturb the existence of other problems. Note that in one embodiment of the present invention, there is no need to achieve all the objects. Other objects will be apparent from and can be derived from the description of the specification, the drawings, the claims, and the like.

One embodiment of the present invention relates to a semiconductor device in which a memory is added to a bus line connected to a processor.

One embodiment of the present invention is a semiconductor device including a processor including a control device and an arithmetic unit, a plurality of bus lines connected to the processor, a first memory connected to each of the bus lines, and a second memory connected to the control device.

Note that in this specification and the like, ordinal numbers such as "first" and "second" are used in order to avoid confusion among components and do not limit the components numerically.

Another embodiment of the present invention is a semiconductor device including a processor including a control device and an arithmetic unit, a memory device, an input/output device, and a plurality of bus lines which is a path for transmitting and receiving instructions, addresses, or data between the processor and the memory device, or the processor and the input/output device. A first memory storing each piece of information over the bus line is connected to each of the bus lines, and a second memory storing a status flag relating to information over the bus line is connected to the control device.

The bus line preferably includes an address bus, a data bus, or an input/output bus.

The first and second memories preferably each include a transistor whose channel formation region is formed using an oxide semiconductor.

Another embodiment of the present invention is a method for driving a semiconductor device including the steps of: stopping power supply of a processor through a method including a procedure for receiving an instruction to stop power supply to the processor during processing and turning off the power supply by interrupting the processing when the processor is in the middle of processing which can be abandoned or outputting processing data over a bus line by continuing the processing when the processor is in the middle of the processing which cannot be abandoned, a procedure for storing the processing data in a first memory connected to the bus line, and a procedure for storing a status flag relating to information over the bus line in a second memory connected to a control device; and continuing the processing from the state before the power supply is stopped through a method including a procedure for initializing a node other than the first and the second memories when the power supply is on again to the processor and starting the processing in accordance with a new instruction in the case where a status flag relating to information over the bus line does not exist in the second memory or reading data from the first memory over the bus line in the case where the status flag relating to information over the bus line exists in the second memory, and a procedure for specifying a circuit receiving data in accordance with contents of the status flag and restoring to the state before the power supply is off.

In the case where the processing which cannot be abandoned remains over the pipeline, the processing is preferably continued until processing of the last instruction set passes through the pipeline.

By using one embodiment of the present invention, a semiconductor device which can consume less power can be provided. Further, a method for driving the semiconductor device which can consume less power can be provided. Further, a highly integrated semiconductor device can be provided. Further, even in the middle of processing, a certain degree of freedom of stopping power supply is given, and when the power supply is resumed, the semiconductor device can easily return to a state before the power supply is stopped.

DETAILED DESCRIPTION OF THE INVENTION

Figure 1:
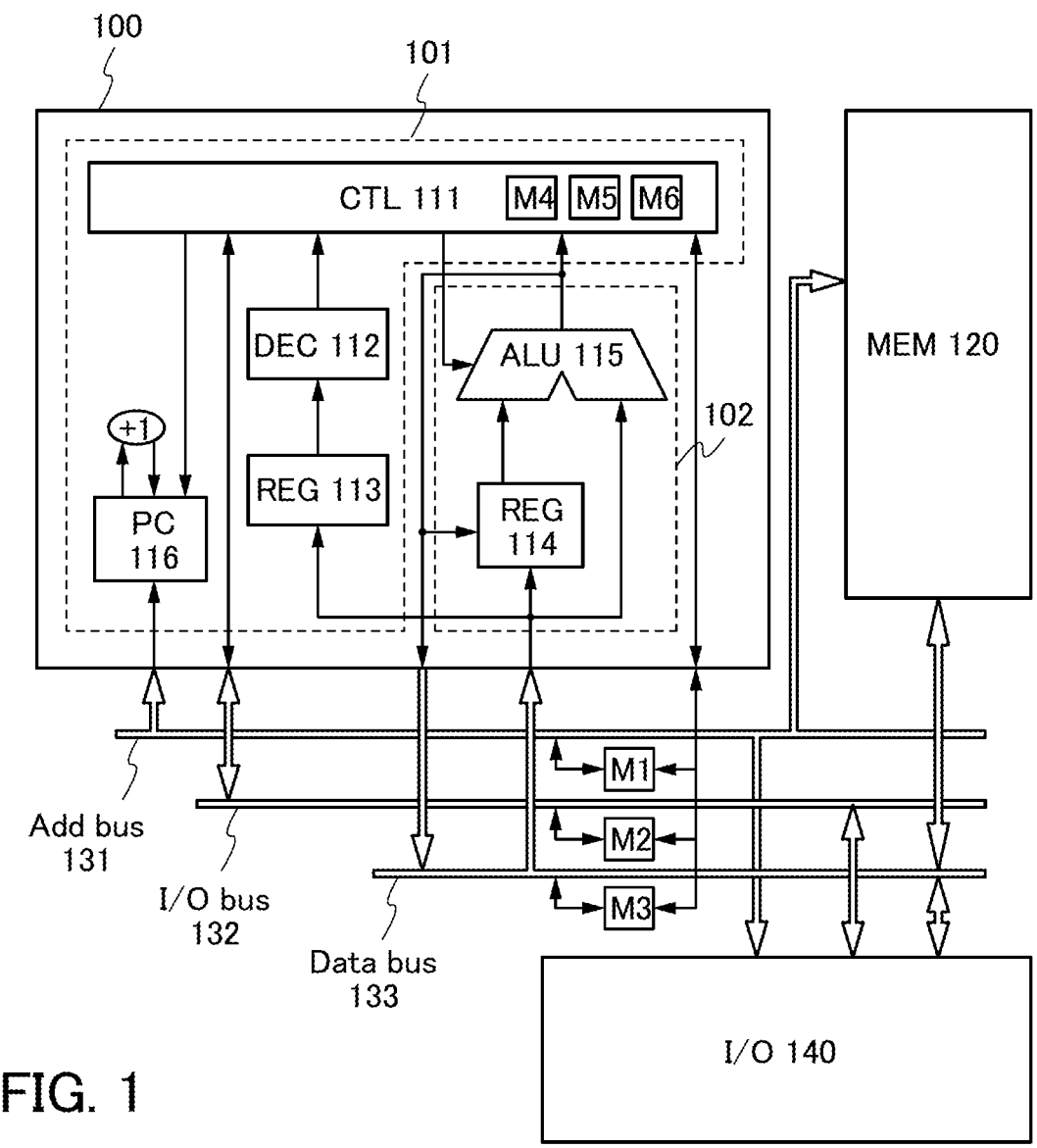
FIG. 1 illustrates a structure of a semiconductor device.

Hereinafter, embodiments of the present invention will be described in detail with reference to the accompanying drawings. However, the present invention is not limited to the description below, and it is easily understood by those skilled in the art that modes and details disclosed herein can be modified in various ways without departing from the spirit and the scope of the present invention. Therefore, the present invention is not construed as being limited to description of the embodiments. Note that in all drawings used to illustrate the embodiments, portions that are identical or portions having similar functions are denoted by the same reference numerals, and their repetitive description may be omitted.

The present invention includes in its category the following semiconductor devices in which a memory device can be used: integrated circuits such as processors, image processing circuits, digital signal processors (DSPs), and microcontrollers, RF tags, and semiconductor display devices. The semiconductor display devices include the following in its category: liquid crystal display devices, light-emitting devices in which a light-emitting element typified by an organic light-emitting element (OLED) is provided for each pixel, electronic paper, digital micromirror devices (DMDs), plasma display panels (PDPs), field emission displays (FEDs), and other semiconductor display devices in which a memory device is included in a driver circuit or a control circuit.
(Embodiment 1)

In this embodiment, a structure of a semiconductor device of one embodiment of the present invention and a method for driving the semiconductor device are described.

Figure 2:
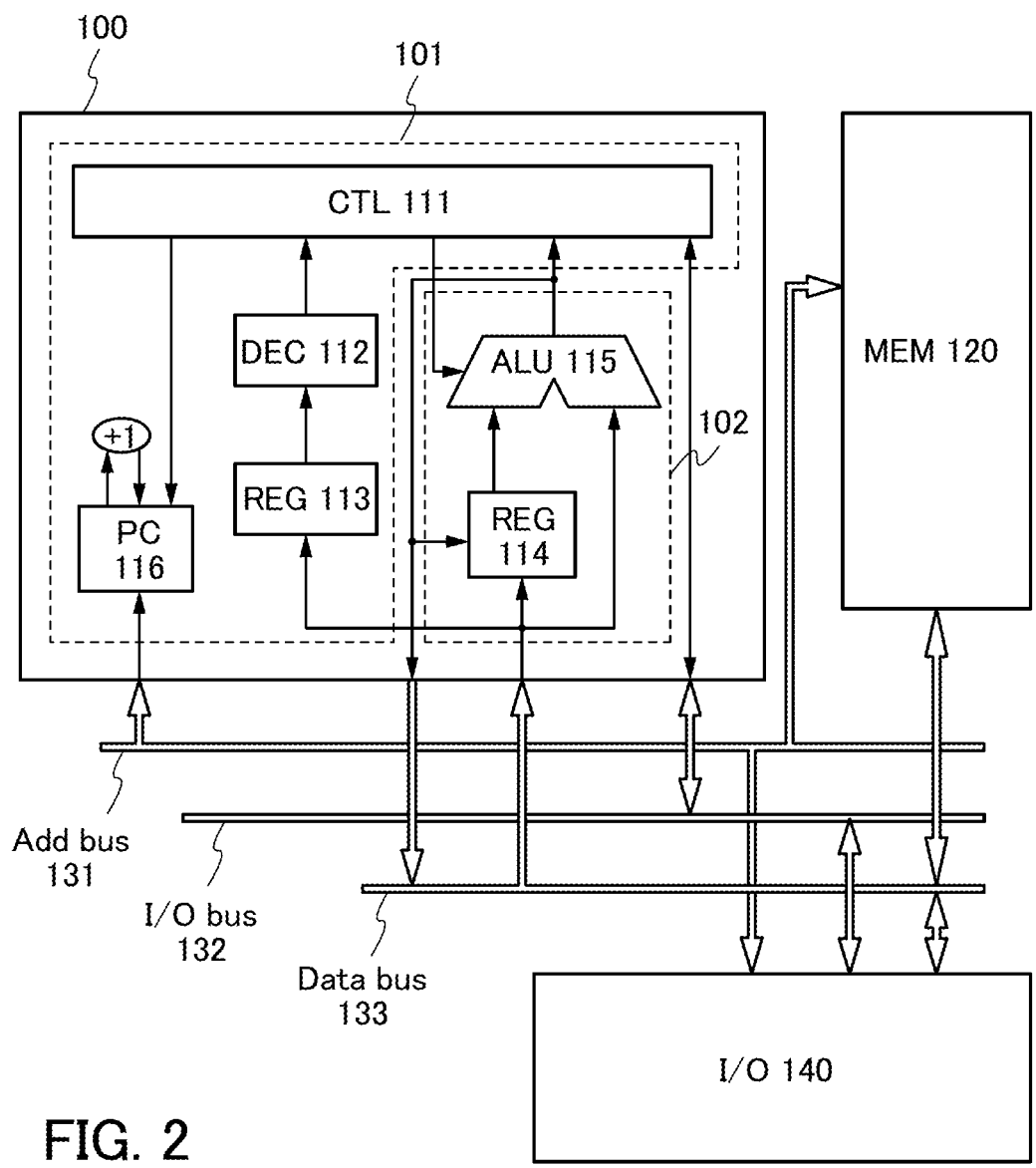
FIG. 2 illustrates a structure of a semiconductor device.

In FIG. 2, an example of a conventional general semiconductor device including a processor, a memory device, an input/output device, and bus lines which connect the processor, the memory device, and the input/output device. A processor 100 includes a control device 101 and an arithmetic unit 102. The control device 101 includes a register 113 which reads instructions, a decoder 112 which decodes the instructions, a controller 111 which manages each node, a program counter 116 which retains an address of a memory storing the instructions, and the like. The arithmetic unit 102 includes a register 114 which stores data being processed, a functional unit 115 which performs an arithmetic operation, and the like.

The processor 100, a memory device 120, and an input/output device 140 are connected by bus lines, and instructions, addresses, data, and the like are transmitted and received through the bus lines. In FIG. 2, an address bus 131 and a data bus 133 which connect the processor 100, the memory device 120, and the input/output device 140, and an input/output bus (I/O bus) 132 which connects the processor 100 and the input/output device 140 are exemplified. Note that the structure in FIG. 2 is an example; thus, a device to which the processor 100 is connected through the bus line is not limited to the above devices.

Further, a structure of the processor 100 or kinds of the bus lines are not limited to the above. For example, a cache memory, a floating-point unit, or the like may be provided in the processor 100. Further, the processor 100 and the memory device 120, and the processor 100 and the input/output device 140 may be connected to each other by different bus lines, and instructions, addresses, and data are transmitted and received.

In FIG. 2, a volatile memory capable of operating at high speed is used as a memory element such as a register included in the processor 100 and a memory element in the memory device 120. Therefore, in a processor, it is necessary to continuously supply power during processing, and in the case where the processing is interrupted by stopping power supply or the like, the processing cannot be resumed from the point of interruption. The state where power is continuously supplied as described above can be called a normally-on state. That is, a processor in which power supply is not controlled by gating or the like is normally-on; thus, the semiconductor device having a structure as illustrated in FIG. 2 is unsuitable for saving power.

Figure 3:
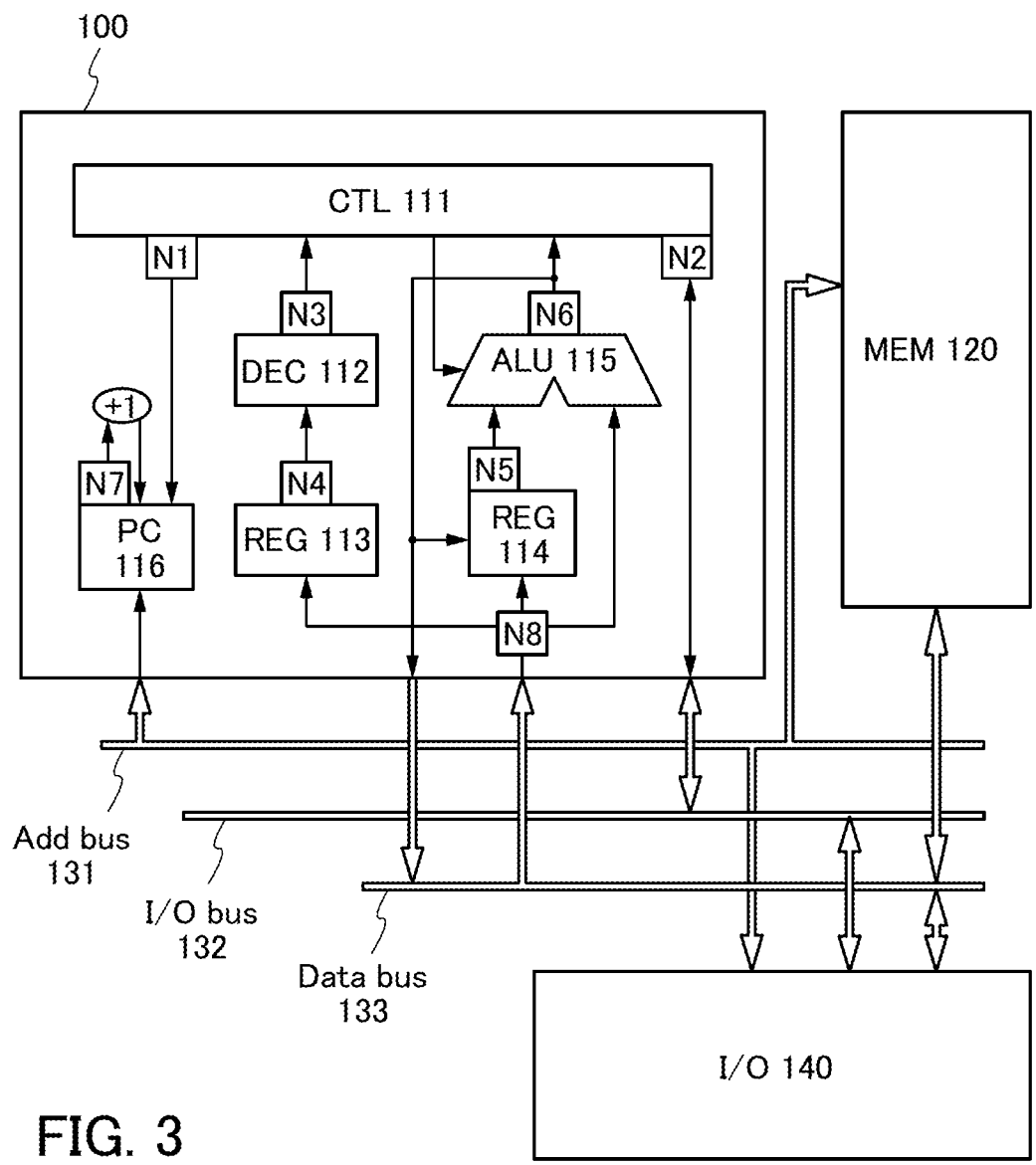
FIG. 3 illustrates a structure of a semiconductor device.

In a normally-off processor in which power supply is positively stopped when the normally-off processor is not in operation, it is necessary to smoothly perform data backup when power supply is stopped or data restoration when power supply is resumed. In order to perform such processes, for example, a semiconductor device as illustrated in FIG. 3, in which nonvolatile memories N1 to N8 are arranged in parallel to output nodes of the circuit having the configuration of FIG. 2, may be used. Further, a memory element may be replaced with a nonvolatile memory.

In this specification, the term "nonvolatile" means a property of maintaining stored data even when power supply is stopped, and the term "volatile" means a property that stored data is instantly erased when power supply is stopped.

However, an occupied area by a memory area such as a register in the processor is large; thus, the arrangement of the nonvolatile memories in parallel as illustrated in FIG. 3 leads to an increase in circuit area. Further, the replacement of the register or the like with the nonvolatile memory is not desirable in terms of operation speed.

A semiconductor device of one embodiment of the present invention, which is conceived in view of such problems, is illustrated in FIG. 1. In a semiconductor device in FIG. 1, nonvolatile memories are provided for the bus lines and in the controller 111 in the processor 100 of the semiconductor device. First nonvolatile memories M1 to M3 are each connected to one of the bus lines and second nonvolatile memories M4 to M6 are provided in the controller 111.

The bus line is a path used for passing information on instructions, addresses, data, and the like which are read, written, and processed in the processor. The bus line is different from an input/output node between particular circuits. At least one-bit nonvolatile memory is connected to each of the bus lines, whereby digital data which appears over the bus line at a certain moment can be held. Through stopping and resuming the power supply, data is read from the nonvolatile memory and resumed over the bus line, whereby the processing before power supply is stopped can be easily continued.

Moreover, the semiconductor device of one embodiment of the present invention does not need to provide a nonvolatile memory in each of the nodes in the processor like the semiconductor device illustrated in FIG. 3; therefore, the circuit area is not extremely increased and an increase in power consumption due to an increase in parasitic capacitance can be suppressed. Further, a memory element such as a register is operated using a volatile memory alone as usual; thus, in normal processing, operation speed is not reduced. That is, in the semiconductor device of one embodiment of the present invention, an extreme increase in the circuit area or reduction in operation speed does not occur; therefore, power saving in a processor by stopping power supply can be efficiently performed.

Digital data held in the first nonvolatile memories M1 to M3 is not limited to data output from a particular circuit, and any data which appears over the bus line can be stored in the first nonvolatile memories M1 to M3. Information such as a source and a destination of the data appearing over the bus line at that time is stored in the second nonvolatile memories M4 to M6, whereby processing after the power supply is resumed can be easily continued. That is, the second nonvolatile memories M4 to M6 arranged in the controller 111 are used for storing a status flag for recording origin of information stored in the first nonvolatile memories M1 to M3 provided corresponding to each of the bus lines.

Each of the bus lines does not connect particular circuits on a one-to-one basis, but data of a plurality of circuits is input and output in time series due to the structure. Therefore, in the case where data over the bus line is stored in the first nonvolatile memory M1, M2, or M3 in certain timing, when the power supply is resumed, it is necessary to identify which circuit generated the data. Contents of the flags stored in the second nonvolatile memories M4 to M6 are not particularly limited in one embodiment of the present invention. For example, a status signal of the processor, an ID of a circuit which is a source, or an ID of a circuit which is a destination may be stored.

Note that the first nonvolatile memories M1 to M3 each connected to the bus line may include the number of bits which is needed for a bus width. Preferably, a one-bit nonvolatile memory cell corresponds to a one-bit bus width. Further, a two or more bits nonvolatile memory cell may correspond to a one-bit bus width. The first nonvolatile memories M1 to M3 operate in accordance with instructions from the controller 111. The instructions of operation may be performed through a signal line only for connecting the first nonvolatile memory and the controller or may be performed through the bus line.

Figure 4:
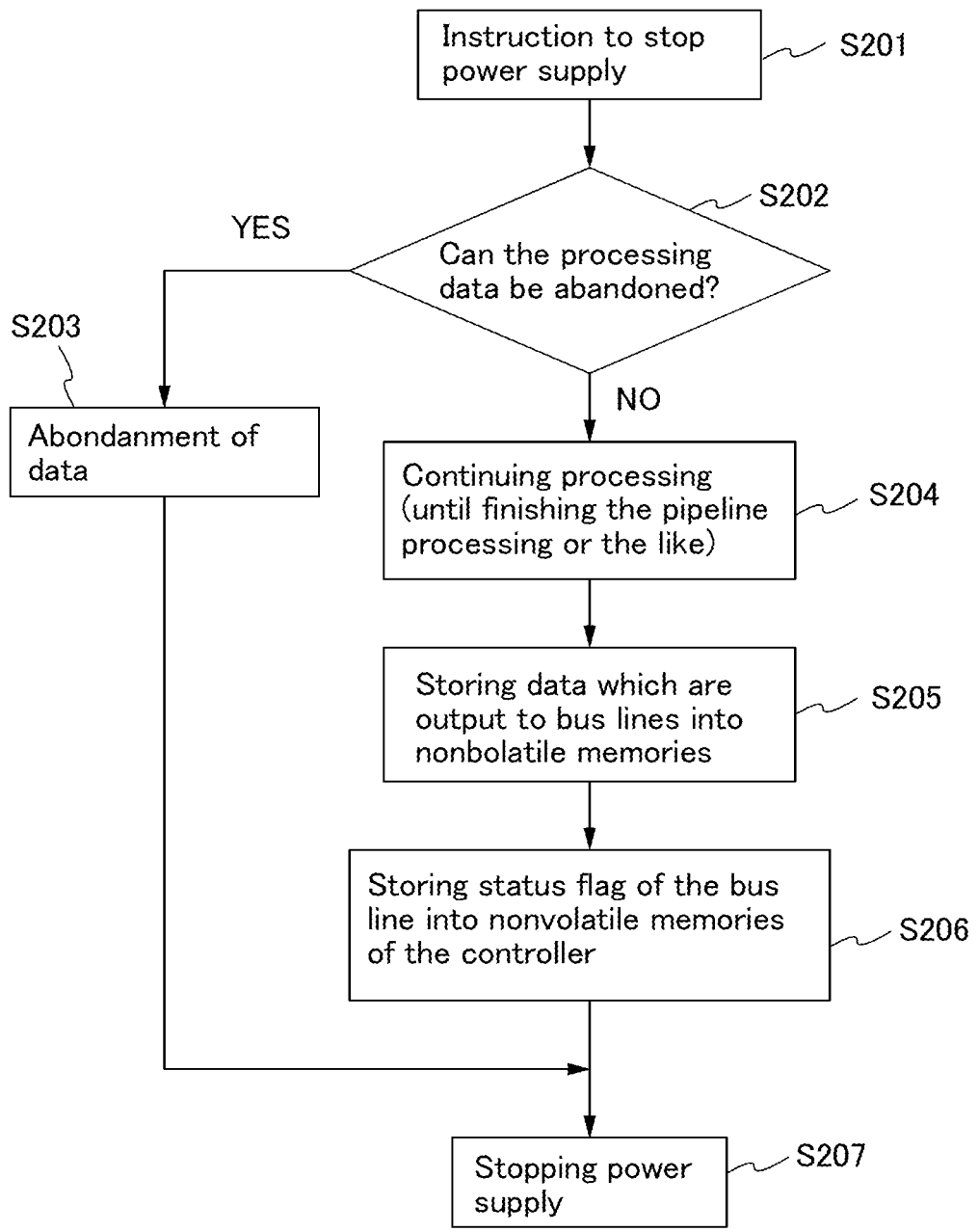
FIG. 4 is a flowchart of operation of a semiconductor device when power supply is stopped.

Next, power supply stopping operation of the semiconductor device of one embodiment of the present invention illustrated in FIG. 1 is described with reference to a flowchart in FIG. 4.

First, in an operation state where processing is performed in a processor, when an instruction to stop power supply is issued (S201), it is determined whether the processing can be abandoned or not (S202). As the determination method, for example, an instruction set included in the processor is preferably classified into instructions which can be abandoned and instructions which cannot be abandoned in advance. Alternatively, a statistical determination method by patterns of the order of the processing of the instruction set or the like may be used.

In the case where it is determined that the processing can be abandoned in accordance with a result of the determination, stopping of the power supply is accepted without through any particular processing (S203). On the other hand, in the case where it is determined that the processing cannot be abandoned, the processing is continued (S204) and a procedure including data backup is performed. In the case where pipeline processing is performed, the processing is continued until processing of the last instruction set passes through the pipeline, and after that, any instruction set is not read, so that all stages of the pipeline is made empty. Here, in the case where processing which can be abandoned remains over the pipeline after the processing which cannot be abandoned is completed, it is not necessary to continue the processing until all stages of the pipeline is empty, and next operation may be performed at once.

After that, data which is output on the basis of the last processing appears over each of the bus lines; thus, the data over each of the bus lines is stored in each of the provided first nonvolatile memories (S205). Moreover, the a status flag is stored in the second nonvolatile memory provided in the controller 111 so as not to erase origin of the data over the bus line at that time after the power supply is resumed (S206). After the above processing is completed, the power supply is stopped (S207).

In the above operation, it is necessary to complete at least the processing remaining over the pipeline from issuing the instruction to stop power supply to actually stopping power supply; therefore, it is necessary to give a time lag for the system. Further, generally, the number of stages of the pipeline is about several stages to several tens of stages and the processing time is about several clock cycles to several tens of clock cycles. Therefore, storage capacitor or the like is added to a power source node inside the processor and the other processing may be completed in a period for consuming charges stored in the storage capacitor.

Figure 5:
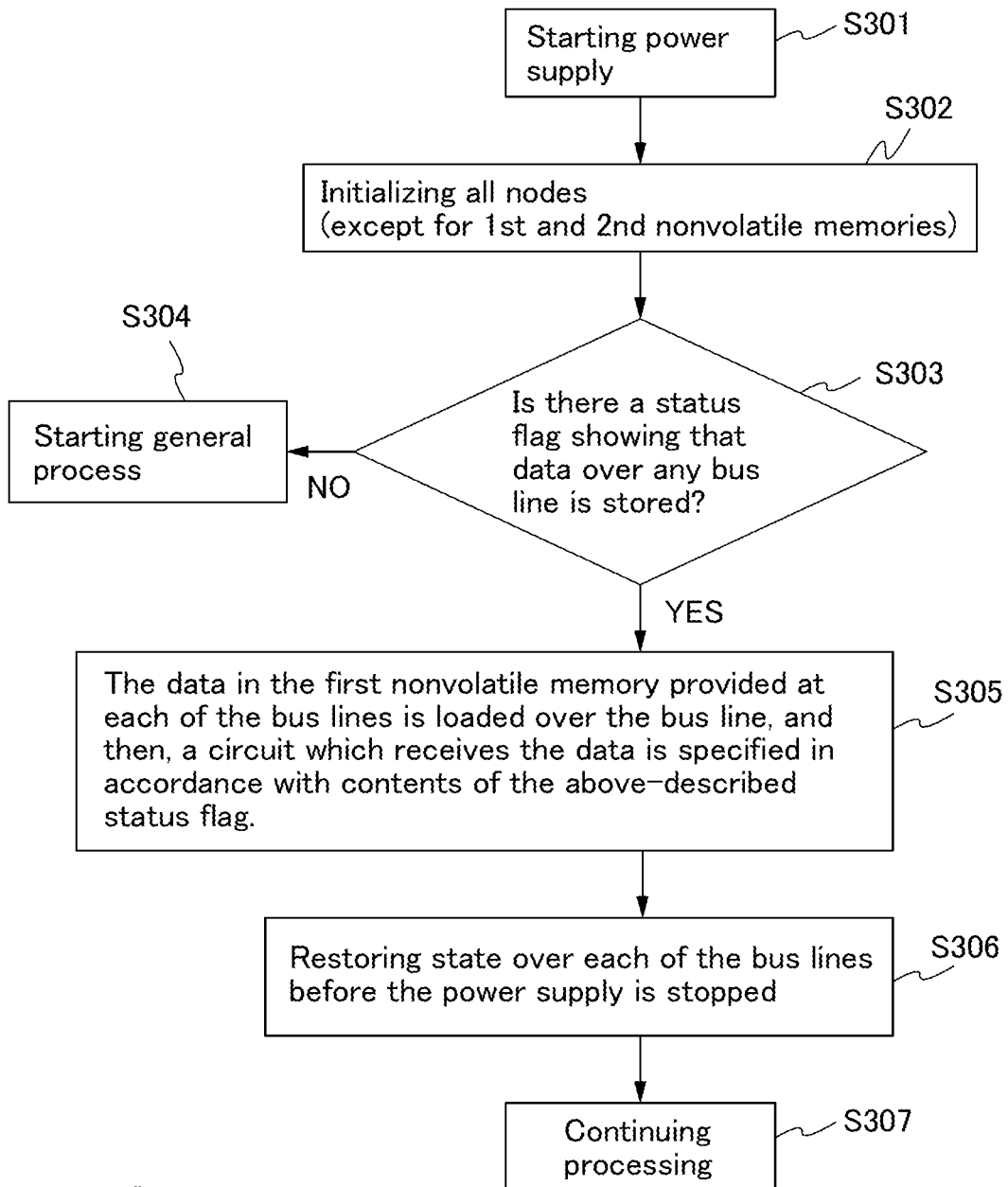
FIG. 5 is a flowchart of operation of a semiconductor device when power supply is resumed.

Next, power supply resuming operation after power supply is stopped is described with reference to a flowchart in FIG. 5.

When the power supply is on (S301), an internal node is initialized by an initial reset (S302), which is similar to the general starting. However, the first and second nonvolatile memories which store data over the bus lines and status flags before the power supply is stopped are out of considering.

After the initial reset is completed, the second nonvolatile memory provided in the controller 111 is referred, and then it is checked whether or not there is a status flag showing that data over any bus line is stored (S303).

When the status flag does not exist in the second nonvolatile memory, it shows that the data over the bus line is not stored at the last stopping of power supply; therefore, after the semiconductor device is started in accordance with the general procedure, new processing of instructions input to the processor is performed (S304).

On the other hand, when the status flag exists in the second nonvolatile memory, the data in the first nonvolatile memory provided at each of the bus lines is loaded over the bus line, and then, a circuit which receives the data is specified in accordance with contents of the above-described status flag (S305). Through the processing up to here, the state over each of the bus lines before the power supply is stopped is restored (S306). After that, the data over the bus line is input to the circuit which receives the data and the processing is continued (S307).

The semiconductor device of one embodiment of the present invention can operate by the above-described method, which can realize more efficient data holding than the method for providing a nonvolatile memory at each of the registers provided for each circuit.

Further, a nonvolatile memory cell is provided at the address bus of the memory device where instructions of processing of the processor is stored, whereby it can also be easily referred to which addresses completes reading of instructions, that is, how far the processing of the processor proceeds.

Note that as the memory cell used for the nonvolatile memory, a memory element which is capable of holding data even when not powered and in which supply, holding, and release of charge to/in a capacitor or a floating node are controlled by a transistor which has small off-state current, or a memory element such as an MRAM, a ReRAM, or a FeRAM can be used.

In particular, in the case where the memory element in which supply, holding, and release of charge to/in a capacitor or a floating node are controlled by a transistor which has extremely small off-state current, data is written by supply of charge; therefore, a current which is necessary for writing data can be reduced to approximately $\frac{1}{100}$ of that in the case where an MRAM or the like is used. Accordingly, a semiconductor device of one embodiment of the present invention which includes the memory element can consume less power.

This embodiment can be implemented in appropriate combination with any of the structures described in the other embodiments.

(Embodiment 2)

In this embodiment, a transistor with extremely low off-state current, which can be used as the nonvolatile memory described in Embodiment 1, and a material used for forming the transistor are described.

As the transistor with extremely low off-state current, for example, a transistor in which a semiconductor having a wide band gap such as an oxide semiconductor is included in a channel formation region is preferably used.

As one example of a semiconductor material which has a wider band gap than a silicon semiconductor and has a lower intrinsic carrier density than silicon, a compound semiconductor such as silicon carbide (SiC) and gallium nitride (GaN) can be given in addition to an oxide semiconductor. However, the oxide semiconductor has an advantage of high mass productivity because the oxide semiconductor can be formed by a sputtering method or a wet process, unlike silicon carbide or gallium nitride. Further, unlike silicon carbide or gallium nitride, the oxide semiconductor can be deposited even at room temperature; thus, deposition over a glass substrate or deposition over an integrated circuit using silicon is possible. Further, a larger substrate can be used. Accordingly, among the semiconductors with wide band gaps, the oxide semiconductor particularly has an advantage of high mass productivity. Further, in the case where an oxide semiconductor with high crystallinity is to be obtained in order to improve the property of a transistor (e.g., field-effect mobility), the oxide semiconductor with crystallinity can be easily obtained by heat treatment at 250° C. to 800° C.

Note that the conductivity type of a highly purified oxide semiconductor (purified OS) obtained by reduction of impurities such as moisture or hydrogen which serves as an electron donor (donor) and by reduction of oxygen vacancies is an i-type or a substantially i-type. Therefore, a transistor including the oxide semiconductor has a characteristic of extremely low off-state current. Furthermore, the band gap of the oxide semiconductor is 2 eV or more, preferably 2.5 eV or more, more preferably 3 eV or more. With the use of the oxide semiconductor film which is highly purified by sufficiently reducing the concentration of impurities such as moisture or hydrogen and by reducing oxygen vacancies, off-state current of the transistor can be reduced.

Specifically, various experiments can prove low off-state current of a transistor including a highly purified oxide semiconductor film as a channel formation region. For example, even when an element has a channel width of $1\times10^6$ μm and a channel length of 10 μm, off-state current can be lower than or equal to the measurement limit of a semiconductor parameter analyzer, i.e., lower than or equal to $1\times10^{-13}$ A, at voltage (drain voltage) between the source electrode and the drain electrode of from 1 V to 10 V. In that case, it can be seen that off-state current standardized on the channel width of the transistor is lower than or equal to 100 zA/μm. In addition, a capacitor and a transistor are connected to each other and the off-state current is measured with a circuit in which charge flowing into or from the capacitor is controlled by the transistor. In the measurement, a highly purified oxide semiconductor film was used for a channel formation region of the transistor, and the off-state current of the transistor was measured from a change in the amount of electric charge of the capacitor per unit hour. As a result, it is found that, in the case where the voltage between the source electrode and the drain electrode of the transistor is 3 V, a lower off-state current density of several tens of yA/μm is obtained. Accordingly, the off-state current of the transistor in which the highly purified oxide semiconductor film is used as a channel formation region is considerably lower than that of a transistor in which silicon having crystallinity is used.

Note that an oxide semiconductor preferably contains at least indium (In) or zinc (Zn). In particular, In and Zn are preferably contained. As a stabilizer for reducing variation in electrical characteristics of a transistor including the oxide semiconductor, gallium (Ga) is preferably additionally included. Tin (Sn) is preferably contained as a stabilizer. Hafnium (Hf) is preferably contained as a stabilizer. Aluminum (Al) is preferably contained as a stabilizer.

As another stabilizer, one or plural kinds of lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) may be contained.

As the oxide semiconductor, for example, indium oxide, tin oxide, zinc oxide, an In—Zn-based oxide, a Sn—Zn-based oxide, an Al—Zn-based oxide, a Zn—Mg-based oxide, a Sn—Mg-based oxide, an In—Mg-based oxide, an In—Ga-based oxide, an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, or an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide can be used. The above oxide semiconductor may contain silicon.

In this specification, an In—Ga—Zn-based oxide means, for example, an oxide including In, Ga, and Zn, and there is no limitation on the ratio of In:Ga:Zn. Further, the In—Ga—Zn-based oxide may contain a metal element other than In, Ga, and Zn. The In—Ga—Zn-based oxide has sufficiently high resistance when there is no electric field; thus, off-state current can be sufficiently reduced. In addition, also having high field-effect mobility, the In—Ga—Zn-based oxide is suitable for a semiconductor material used in a semiconductor device.

For example, an In—Ga—Zn-based oxide with an atomic ratio of In:Ga:Zn=1:1:1 (=$\frac{1}{3}$:$\frac{1}{3}$:$\frac{1}{3}$) or In:Ga:Zn=2:2:1 (=$\frac{2}{5}$:$\frac{2}{5}$:$\frac{1}{5}$), or an oxide with an atomic ratio close to the above atomic ratios can be used. Alternatively, an In—Sn—Zn-based oxide with an atomic ratio of In:Sn:Zn=1:1:1 (=1/3:1/3:1/3), In:Sn:Zn=2:1:3 (=1/3:1/6:1/2), or In:Sn:Zn=2:1:5 (=1/4:1/8:5/8), or an oxide with an atomic ratio close to the above atomic ratios may be used.

However, the composition is not limited to those described above, and a material having an appropriate composition can be used in accordance with necessary electrical characteristics (such as mobility, threshold voltage, and variation). In order to obtain the necessary semiconductor characteristics, the carrier density, the impurity concentration, the defect density, the atomic ratio between a metal element and oxygen, the interatomic distance, the density, and the like are preferably set to appropriate values.

For example, the oxide semiconductor film can be formed by a sputtering method using a target including indium (In), gallium (Ga), and zinc (Zn). In the case of forming an In—Ga—Zn-based oxide semiconductor film by a sputtering method, it is preferable to use a target of an In—Ga—Zn-based oxide having an atomic ratio of In:Ga:Zn=1:1:1, 4:2:3, 3:1:2, 1:1:2, 2:1:3, or 3:1:4. When an oxide semiconductor film is formed using a target of an In—Ga—Zn-based oxide having the above atomic ratio, a polycrystal or CAAC is easily formed. The filling factor of the target including In, Ga, and Zn is 90% or higher, and preferably 95% or higher. With the use of the target with high filling rate, a dense oxide semiconductor film is formed.

In the case where an In—Zn-based oxide material is used as an oxide semiconductor, a target has a composition of In:Zn=50:1 to 1:2 in an atomic ratio ($In_2O_3$:ZnO=25:1 to 1:4 in a molar ratio), preferably In:Zn=20:1 to 1:1 in an atomic ratio ($In_2O_3$:ZnO=10:1 to 1:2 in a molar ratio), more preferably In:Zn=1.5:1 to 15:1 in an atomic ratio ($In_2O_3$:ZnO=3:4 to 15:2 in a molar ratio). For example, in a target used for formation of an oxide semiconductor film including an In—Zn-based oxide which has an atomic ratio of In:Zn:O=X:Y:Z, the relation of Z>1.5X+Y is satisfied. The mobility can be improved by keeping the ratio of Zn within the above range.

In the case of forming a film of an In—Sn—Zn-based oxide semiconductor film as an oxide semiconductor film by a sputtering method, it is preferable to use an In—Sn—Zn—O target having the atomic ratio of In:Sn:Zn is 1:1:1, 2:1:3, 1:2:2, or 20:45:35.

Specifically, the oxide semiconductor film can be formed as follows: the substrate is held in the chamber with pressure reduced, residual moisture in the chamber is removed, a sputtering gas from which hydrogen and moisture are removed is introduced, and the above-described target is used. The substrate temperature can be 100° C. to 600° C., preferably 200° C. to 400° C. in deposition. By forming the oxide semiconductor film in a state where the substrate is heated, the concentration of impurities included in the formed oxide semiconductor film can be reduced. In addition, damage by sputtering can be reduced. In order to remove remaining moisture in the deposition chamber, an entrapment vacuum pump is preferably used. For example, a cryopump, an ion pump, or a titanium sublimation pump is preferably used. The evacuation unit may be a turbo pump provided with a cold trap. In the deposition chamber which is evacuated with the cryopump, for example, a hydrogen atom, a compound containing a hydrogen atom, such as water ($H_2O$), (more preferably, also a compound containing a carbon atom), and the like are removed, whereby the impurity concentration in the oxide semiconductor film formed in the deposition chamber can be reduced.

Note that the oxide semiconductor film formed by sputtering or the like contains a large amount of moisture or hydrogen (containing a hydroxyl group) as an impurity in some cases. Moisture and hydrogen easily form a donor level and thus serve as impurities in the oxide semiconductor. Thus, in order to reduce impurities such as moisture or hydrogen in the oxide semiconductor film (in order to perform dehydration or dehydrogenation), the oxide semiconductor film is subjected to heat treatment in a reduced-pressure atmosphere, an inert gas atmosphere of nitrogen, a rare gas, or the like, an oxygen gas atmosphere, or ultra dry air (the moisture amount is 20 ppm (−55° C. by conversion into a dew point) or less, preferably 1 ppm or less, more preferably 10 ppb or less, in the case where measurement is performed by a dew point meter in a cavity ring down laser spectroscopy (CRDS) method).

By performing heat treatment on the oxide semiconductor film, moisture or hydrogen in the oxide semiconductor film can be eliminated. Specifically, heat treatment can be performed at a temperature higher than or equal to 250° C. and lower than or equal to 750° C., preferably higher than or equal to 400° C. and lower than the strain point of a substrate. For example, heat treatment can be performed at 500° C. for approximately three minutes to six minutes. When an RTA method is used for the heat treatment, dehydration or dehydrogenation can be performed in a short time; therefore, treatment can be performed even at a temperature higher than the strain point of a glass substrate.

Note that in some cases, the heat treatment makes oxygen released from the oxide semiconductor film and oxygen vacancies are formed in the oxide semiconductor film. In this case, it is preferable that treatment for supplying oxygen to the oxide semiconductor film be performed after the heat treatment, whereby reducing oxygen vacancies.

For example, by heat treatment performed in an atmosphere containing oxygen, oxygen can be supplied to the oxide semiconductor film. Heat treatment for supplying oxygen can be performed under conditions similar to those of the above heat treatment for reducing the concentration of moisture or hydrogen. Note that heat treatment for supplying oxygen is performed in an atmosphere containing oxygen, such as an oxygen gas or an ultra dry air atmosphere (the moisture content is lower than or equal to 20 ppm (−55° C. by conversion into a dew point), preferably lower than or equal to 1 ppm, further preferably lower than or equal to 10 ppb, in the measurement with use of a dew point meter of a cavity ring down laser spectroscopy (CRDS) system).

It is preferable that in the gas containing oxygen, the concentration of water or hydrogen be low. Specifically, the concentration of impurities in the oxygen gas is lower than or equal to 1 ppm, preferably lower than or equal to 0.1 ppm.

Alternatively, as a method for supplying oxygen to the oxide semiconductor film, an ion implantation method, an ion doping method, a plasma immersion ion implantation method, plasma treatment, or the like can be used. If a crystal part included in the oxide semiconductor film is damaged after oxygen is supplied to the oxide semiconductor film, heat treatment can be performed so that the damaged crystal part is repaired.

An insulating film containing oxygen can be used as an insulating film, such as a gate insulating film which is in contact with the oxide semiconductor film so that oxygen is supplied from the insulating film to the oxide semiconductor film. The oxygen-containing insulating layer is preferably made to contain oxygen in a proportion higher than that in the stoichiometric composition by heat treatment in an oxygen atmosphere, oxygen doping, or the like. "Oxygen doping" refers to addition of oxygen into a semiconductor film. In addition, "oxygen doping" includes oxygen plasma doping by which oxygen plasma is added to a semiconductor film.

The oxygen doping may be performed by ion implantation or ion doping. By oxygen doping treatment, an insulating film that includes a region where the proportion of oxygen is higher than that in the stoichiometric composition can be formed. Then, a heat treatment is performed after formation of the insulating film including oxygen, so that oxygen is supplied from the insulating film to the oxide semiconductor film. With the above structure, oxygen vacancies serving as donors can be reduced in the oxide semiconductor film and the stoichiometric composition of the oxide semiconductor included in the oxide semiconductor film can be satisfied. As a result, the oxide semiconductor film can be made substantially i-type and variation in electrical characteristics of the transistors due to oxygen vacancies can be reduced; thus, electrical characteristics can be improved.

The heat treatment for supplying oxygen from the insulating film to the oxide semiconductor film is performed in a nitrogen atmosphere, ultra-dry air, or a rare gas (e.g., argon or helium) atmosphere preferably at temperatures ranging from 200° C. to 400° C., for example, from 250° C. to 350° C. It is preferable that the water content in the gas be 20 ppm or less, preferably 1 ppm or less, further preferably 10 ppb or less.

A structure of an oxide semiconductor film which can be used for one embodiment of the present invention is described below.

In this specification, a term "parallel" indicates that the angle formed between two straight lines is greater than or equal to −10° and less than or equal to 10°, and accordingly also includes the case where the angle is greater than or equal to −5° and less than or equal to 5°. In addition, a term "perpendicular" indicates that the angle formed between two straight lines is greater than or equal to 80° and less than or equal to 100°, and accordingly includes the case where the angle is greater than or equal to 85° and less than or equal to 95°.

In this specification, the trigonal and rhombohedral crystal systems are included in the hexagonal crystal system.

An oxide semiconductor film is classified roughly into a single-crystal oxide semiconductor film and a non-single-crystal oxide semiconductor film. The non-single-crystal oxide semiconductor film includes any of an amorphous oxide semiconductor film, a microcrystalline oxide semiconductor film, a polycrystalline oxide semiconductor film, a c-axis aligned crystalline oxide semiconductor (CAAC-OS) film, and the like.

The amorphous oxide semiconductor film has disordered atomic arrangement and no crystalline component. A typical example thereof is an oxide semiconductor film in which no crystal part exists even in a microscopic region, and the whole of the film is amorphous.

The microcrystalline oxide semiconductor film includes a microcrystal (also referred to as nanocrystal) with a size greater than or equal to 1 nm and less than 10 nm, for example. Thus, the microcrystalline oxide semiconductor film has a higher degree of atomic order than the amorphous oxide semiconductor film. Hence, the density of defect states of the microcrystalline oxide semiconductor film is lower than that of the amorphous oxide semiconductor film.

The CAAC-OS film is one of oxide semiconductor films including a plurality of crystal parts, and most of the crystal parts each fit inside a cube whose one side is less than 100 nm. Thus, there is a case where a crystal part included in the CAAC-OS film fits a cube whose one side is less than 10 nm, less than 5 nm, or less than 3 nm. The density of defect states of the CAAC-OS film is lower than that of the microcrystalline oxide semiconductor film. The CAAC-OS film is described in detail below.

In a transmission electron microscope (TEM) image of the CAAC-OS film, a boundary between crystal parts, that is, a grain boundary is not clearly observed. Thus, in the CAAC-OS film, a reduction in electron mobility due to the grain boundary is less likely to occur.

According to the TEM image of the CAAC-OS film observed in a direction substantially parallel to a sample surface (cross-sectional TEM image), metal atoms are arranged in a layered manner in the crystal parts. Each metal atom layer has a morphology reflected by a surface over which the CAAC-OS film is formed (hereinafter, a surface over which the CAAC-OS film is formed is referred to as a formation surface) or a top surface of the CAAC-OS film, and is arranged in parallel to the formation surface or the top surface of the CAAC-OS film.

On the other hand, according to the TEM image of the CAAC-OS film observed in a direction substantially perpendicular to the sample surface (plan TEM image), metal atoms are arranged in a triangular or hexagonal configuration in the crystal parts. However, there is no regularity of arrangement of metal atoms between different crystal parts.

From the results of the cross-sectional TEM image and the plan TEM image, alignment is found in the crystal parts in the CAAC-OS film.

A CAAC-OS film is subjected to structural analysis with an X-ray diffraction (XRD) apparatus. For example, when the CAAC-OS film including an $InGaZnO_4$ crystal is analyzed by an out-of-plane method, a peak appears frequently when the diffraction angle (2θ) is around 31°. This peak is derived from the (009) plane of the $InGaZnO_4$ crystal, which indicates that crystals in the CAAC-OS film have c-axis alignment, and that the c-axes are aligned in a direction substantially perpendicular to the formation surface or the top surface of the CAAC-OS film.

On the other hand, when the CAAC-OS film is analyzed by an in-plane method in which an X-ray enters a sample in a direction perpendicular to the c-axis, a peak appears frequently when 2θ is around 56°. This peak is derived from the (110) plane of the $InGaZnO_4$ crystal. Here, analysis (φ scan) is performed under conditions where the sample is rotated around a normal vector of a sample surface as an axis (φ axis) with 2θ fixed at around 56°. In the case where the sample is a single-crystal oxide semiconductor film of $InGaZnO_4$, six peaks appear. The six peaks are derived from crystal planes equivalent to the (110) plane. On the other hand, in the case of a CAAC-OS film, a peak is not clearly observed even when φ scan is performed with 2θ fixed at around 56°.

According to the above results, in the CAAC-OS film having c-axis alignment, while the directions of a-axes and b-axes are different between crystal parts, the c-axes are aligned in a direction parallel to a normal vector of a formation surface or a normal vector of a top surface. Thus, each metal atom layer arranged in a layered manner observed in the cross-sectional TEM image corresponds to a plane parallel to the a-b plane of the crystal.

Note that the crystal part is formed concurrently with deposition of the CAAC-OS film or is formed through crystallization treatment such as heat treatment. As described above, the c-axis of the crystal is aligned in a direction parallel to a normal vector of a formation surface or a normal vector of a top surface. Thus, for example, in the case where a shape of the CAAC-OS film is changed by etching or the like, the c-axis might not be necessarily parallel to a normal vector of a formation surface or a normal vector of a top surface of the CAAC-OS film.

Further, the degree of crystallinity in the CAAC-OS film is not necessarily uniform. For example, in the case where crystal growth leading to the CAAC-OS film occurs from the vicinity of the top surface of the film, the degree of the crystallinity in the vicinity of the top surface is higher than that in the vicinity of the formation surface in some cases. Further, when an impurity is added to the CAAC-OS film, the crystallinity in a region to which the impurity is added is changed, and the degree of crystallinity in the CAAC-OS film varies depending on regions.

Note that when the CAAC-OS film with an $InGaZnO_4$ crystal is analyzed by an out-of-plane method, a peak of $2\theta$ may also be observed at around 36°, in addition to the peak of $2\theta$ at around 31°. The peak of $2\theta$ at around 36° indicates that a crystal having no c-axis alignment is included in part of the CAAC-OS film. It is preferable that in the CAAC-OS film, a peak of $2\theta$ appear at around 31° and a peak of $2\theta$ do not appear at around 36°.

In a transistor using the CAAC-OS film, change in electric characteristics due to irradiation with visible light or ultraviolet light is small. Thus, the transistor has high reliability.

Note that an oxide semiconductor film may be a stacked film including two or more films of an amorphous oxide semiconductor film, a microcrystalline oxide semiconductor film, and a CAAC-OS film, for example.

This embodiment can be implemented in appropriate combination with any of the structures described in the other embodiments.

(Embodiment 3)

In this embodiment, one example of a memory device including a transistor including an oxide semiconductor, which can be used as the nonvolatile memory described in Embodiment 1, is described with reference to drawings.

Figure 6A:
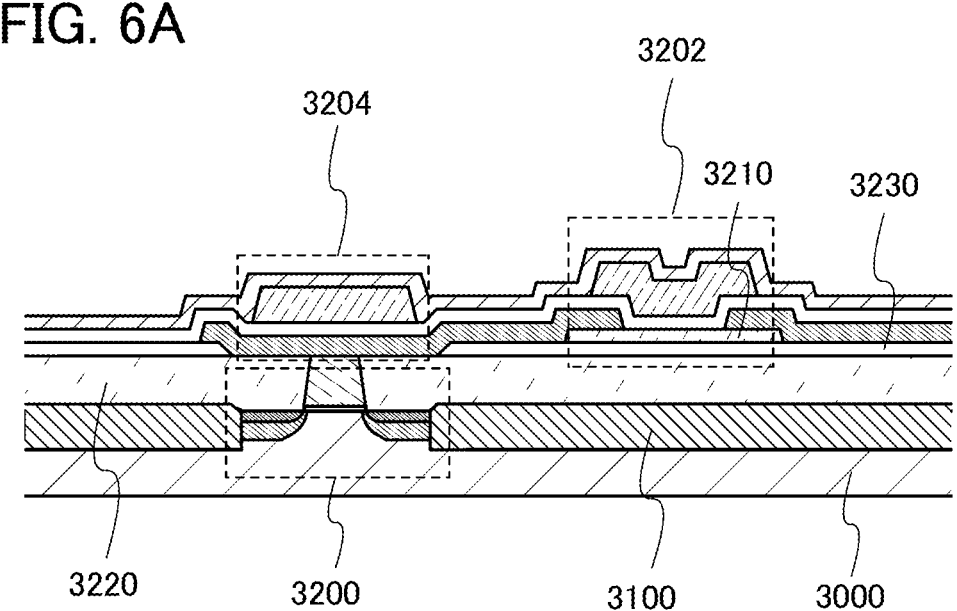
FIGS. 6A and 6B are a structure diagram and a circuit diagram of a memory device.
Figure 6B:
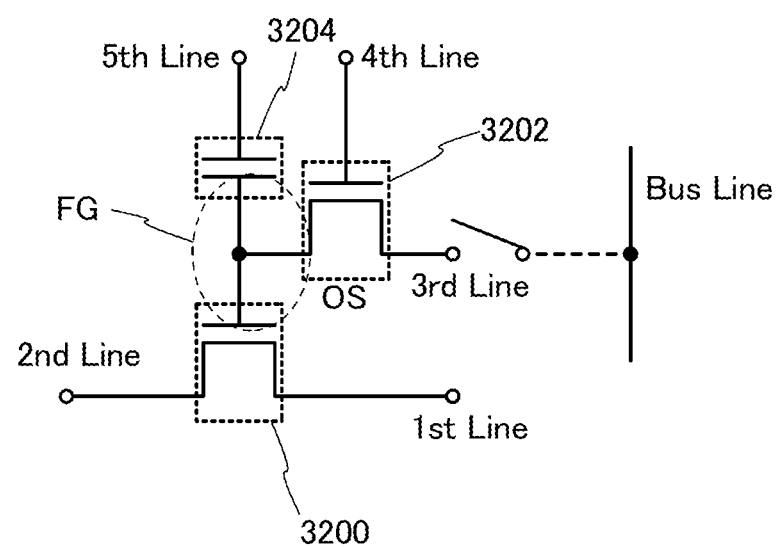

FIGS. 6A and 6B illustrate an example of a configuration of the memory device. FIG. 6A is a cross-sectional view of the memory device, and FIG. 6B is a circuit diagram of the memory device.

The memory device illustrated in FIGS. 6A and 6B includes a transistor 3200 using a first semiconductor material (substrate 3000) for a channel formation region in a lower portion, and a transistor 3202 using a second semiconductor material 3210 for a channel formation region and a capacitor 3204 in an upper portion. One electrode of the capacitor 3204 is formed using the same material as a gate electrode of the transistor 3202, the other electrode thereof is formed using the same material as a source electrode and a drain electrode of the transistor 3202, and a dielectric thereof is formed using the same material as a gate insulating film of the transistor 3202; thus, the capacitor 3204 can be formed concurrently with the transistor 3202.

Note that as the transistor 3202, a top-gate transistor in a non-self-aligned manner is illustrated as one example; however, a transistor in a self-aligned manner or a bottom-gate transistor may be used. Further, although not illustrated, a conductive layer is provided to overlap with the second semiconductor material 3210 with a base insulating layer 3230 provided therebetween, and then, the conductive layer may function as a second gate electrode. By providing the second gate electrode, variation in threshold voltage or the like can be suppressed.

Here, the first semiconductor material (substrate 3000) and the second semiconductor material 3210 are preferably materials having different band gaps. For example, the first semiconductor material (substrate 3000) may be a semiconductor material (such as silicon) other than an oxide semiconductor, and the second semiconductor material 3210 may be an oxide semiconductor. A transistor including a material other than an oxide semiconductor can operate at high speed easily. On the other hand, a transistor including an oxide semiconductor enables charge to be held for a long time owing to its characteristics.

Although both of the above transistors are n-channel transistors in the following description, it is needless to say that p-channel transistors can be used. The specific structure of the memory device, such as the material used for the memory device and the structure of the memory device, is not necessarily limited to those described here except for the use of the transistor, which is formed using an oxide semiconductor for holding data.

The transistor 3200 in FIG. 6A includes a channel formation region provided in a substrate 3000 including a semiconductor material (such as crystalline silicon), impurity regions provided such that the channel formation region is sandwiched therebetween, intermetallic compound regions provided in contact with the impurity regions, a gate insulating film provided over the channel formation region, and a gate electrode layer provided over the gate insulating film. Note that a transistor whose source electrode layer and drain electrode layer are not illustrated in a drawing may also be referred to as a transistor for the sake of convenience. Further, in such a case, in description of a connection of a transistor, a source region and a source electrode layer may be collectively referred to as a source electrode layer, and a drain region and a drain electrode layer may be collectively referred to as a drain electrode layer. That is, in this specification, the term "source electrode layer" may include a source region.

Further, an element isolation insulating layer 3100 is formed on the substrate 3000 so as to surround the transistor 3200, and an insulating layer 3220 is formed so as to cover the transistor 3200. Note that the element isolation insulating layer 3100 can be formed by an element isolation technique such as local oxidation of silicon (LOCOS) or shallow trench isolation (STI).

For example, the transistor 3200 formed using a crystalline silicon substrate can operate at high speed. Thus, when the transistor is used as a reading transistor, data can be read at high speed. As treatment prior to formation of the transistor 3202 and the capacitor 3204, CMP treatment is performed on the insulating layer 3220 covering the transistor 3200, whereby the insulating layer 3220 is planarized and, at the same time, an upper surface of the gate electrode layer of the transistor 3200 is exposed.

The gate electrode of the transistor 3200 is electrically connected to one electrode of the capacitor 3204, which extends from one of the source electrode and the drain electrode of the transistor 3202 provided over the insulating layer 3220.

The transistor 3202 in FIG. 6A is a bottom-gate transistor in which a channel is formed in an oxide semiconductor layer. Since the off-state current of the transistor 3202 is small, stored data can be held for a long time owing to such a transistor. In other words, refresh operation becomes unnecessary or the frequency of the refresh operation in a semiconductor memory device can be extremely lowered, which leads to a sufficient reduction in power consumption.

The transistor 3200 and the capacitor 3204 can be formed so as to overlap with each other as illustrated in FIG. 6A, whereby the area occupied by them can be reduced. Accordingly, the degree of integration of the memory device can be increased.

An example of a circuit configuration corresponding to FIG. 6A is illustrated in FIG. 6B.

In FIG. 6B, a first wiring (1st Line) is electrically connected to a source electrode layer of the transistor 3200. A second wiring (2nd Line) is electrically connected to a drain electrode layer of the transistor 3200. A third wiring (3rd Line) is electrically connected to one of the source and drain electrode layers of the transistor 3202, and a fourth wiring (4th Line) is electrically connected to the gate electrode layer of the transistor 3202. The gate electrode layer of the transistor 3200 and the other of the source and drain electrode layers of the transistor 3202 are electrically connected to the one electrode of the capacitor 3204. A fifth wiring (5th Line) is electrically connected to the other electrode of the capacitor 3204.

The memory device in FIG. 6B utilizes a characteristic in which the potential of the gate electrode layer of the transistor 3200 can be held, and thus enables data writing, holding, and reading as follows.

Writing and holding of data will be described. First, the potential of the fourth wiring is set to a potential at which the transistor 3202 is turned on, so that the transistor 3202 is turned on. Accordingly, the potential of the third wiring is supplied to the gate electrode layer of the transistor 3200 and to the capacitor 3204. That is, predetermined charge is supplied to the gate electrode layer of the transistor 3200 (writing). Here, one of two kinds of charges providing different potential levels (hereinafter referred to as a low-level charge and a high-level charge) is supplied. After that, the potential of the fourth wiring is set to a potential at which the transistor 3202 is turned off, so that the transistor 3202 is turned off. Thus, the charge supplied to the gate electrode layer of the transistor 3200 is held (holding).

Since the off-state current of the transistor 3202 is significantly small, the charge of the gate electrode layer of the transistor 3200 is held for a long time.

In the case where the memory device in this embodiment is applied to the semiconductor device in Embodiment 1, the third wiring (3rd Line) is electrically connected to the bus line. Note that a switch such as a transistor may be provided between the third wiring (3rd Line) and the bus line.

Next, reading of data will be described. By supplying an appropriate potential (a reading potential) to the fifth wiring while supplying a predetermined potential (a constant potential) to the first wiring, the potential of the second wiring varies depending on the amount of charge held at the gate electrode layer of the transistor 3200. This is because in general, when the transistor 3200 is an n-channel transistor, an apparent threshold voltage $V_{th\_H}$ in the case where the high-level charge is given to the gate electrode layer of the transistor 3200 is lower than an apparent threshold voltage $V_{th\_L}$ in the case where the low-level charge is given to the gate electrode layer of the transistor 3200. Here, an apparent threshold voltage refers to the potential of the fifth wiring which is needed to turn on the transistor 3200. Thus, the potential of the fifth wiring is set to a potential $V_0$ which is between $V_{th\_H}$ and $V_{th\_L}$, whereby charge supplied to the gate electrode layer of the transistor 3200 can be determined. For example, in the case where the high-level charge is supplied in writing, when the potential of the fifth wiring is $V_0$ ($>V_{th\_H}$), the transistor 3200 is turned on. In the case where the low-level charge is supplied in writing, even when the potential of the fifth wiring is $V_0$ ($<V_{th\_L}$), the transistor 3200 remains off. Therefore, the data held can be read by determining the potential of the second wiring.

Note that in the case where memory cells are arrayed, it is necessary that data of only a desired memory cell can be read. In the case where such reading is not performed, a potential at which the transistor 3200 is turned off, that is, a potential smaller than $V_{th\_H}$ may be supplied to the fifth wiring regardless of the state of the gate electrode layer. Alternatively, the fifth wirings may be supplied with a potential at which the transistor 3200 is turned on regardless of the state of the gate electrode layer, that is, a potential higher than $V_{th\_L}$.

When including a transistor having a channel formation region formed using an oxide semiconductor and having extremely small off-state current, the memory device described in this embodiment can store data for an extremely long period. In other words, refresh operation becomes unnecessary or the frequency of the refresh operation can be extremely lowered, which leads to a sufficient reduction in power consumption. Moreover, stored data can be held for a long period even when power is not supplied (note that a potential is preferably fixed). That is, the memory device described in this embodiment can be substantially used as a nonvolatile memory.

Further, in the memory device described in this embodiment, high voltage is not needed for writing data and there is no problem of deterioration of elements. For example, unlike a conventional nonvolatile memory, it is not necessary to inject and extract electrons into and from a floating gate, and thus a problem such as deterioration of a gate insulating film does not arise at all. That is, the memory device according to the disclosed invention does not have a limitation on the number of times data can be rewritten, which is a problem of a conventional nonvolatile memory, and the reliability thereof is drastically improved. Furthermore, data is written depending on the on state and the off state of the transistor, whereby high-speed operation can be easily achieved.

This embodiment can be implemented in appropriate combination with any of the structures described in the other embodiments.

(Embodiment 4)

In this embodiment, a memory device whose structure is different from that of Embodiment 3, which can be used as the nonvolatile memory described in Embodiment 1, is described.

Figure 7:
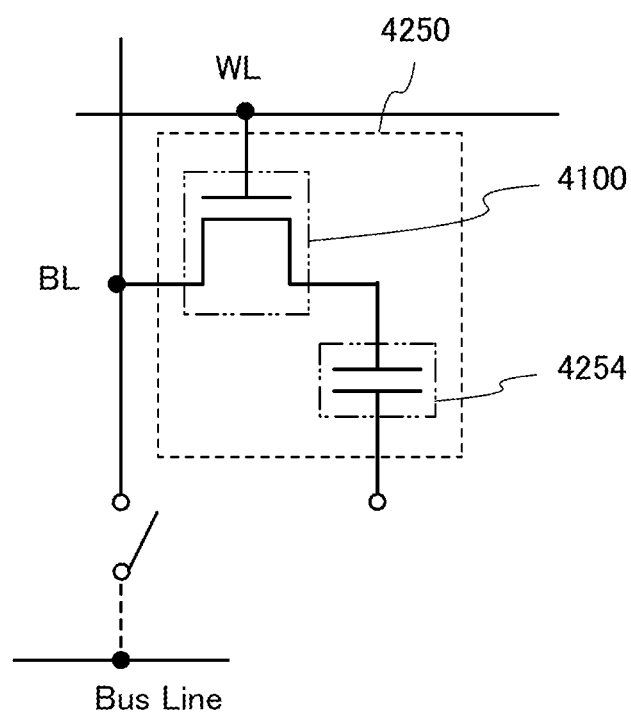
FIG. 7 is a circuit diagram of a memory device.

FIG. 7 illustrates one example of a circuit configuration of a memory device. Note that as the transistor 4100 included in the memory device, a transistor whose structure is similar to the transistor 3202 described in Embodiment 3 can be used. A capacitor 4254 can be formed similarly to the capacitor 3204 described in Embodiment 3 through the same process as and concurrently with the transistor 4100.

In the memory device illustrated in FIG. 7, a bit line BL is electrically connected to a source electrode of the transistor 4100, a word line WL is electrically connected to a gate electrode of the transistor 4100, and a drain electrode of the transistor 4100 is electrically connected to one terminal of the capacitor 4254.

In the case where the memory device in this embodiment is applied to the semiconductor device in Embodiment 1, the bit line BL is electrically connected to the bus line. Note that a switch such as a transistor may be provided between the bit line BL and the bus line.

Next, writing and holding of data in the memory device (a memory cell 4250) illustrated in FIG. 7 will be described.

First, the potential of the word line WL is set to a potential at which the transistor 4100 is turned on, and the transistor 4100 is turned on. Accordingly, the potential of the bit line BL is supplied to the one terminal of the capacitor 4254 (writing). After that, the potential of the word line WL is set to a potential at which the transistor 4100 is turned off, so that the transistor 4100 is turned off. Thus, the potential at the one terminal of the capacitor 4254 is held (holding).

In addition, the amount of off-state current is extremely small in the transistor 4100 which uses an oxide semiconductor. For that reason, the potential of the first terminal of the capacitor 4254 (or a charge accumulated in the capacitor 4254) can be held for an extremely long period by turning off the transistor 4100.

Next, reading of data will be described. When the transistor 4100 is turned on, the bit line BL which is in a floating state and the capacitor 4254 are electrically connected to each other, and the charge is redistributed between the bit line BL and the capacitor 4254. As a result, the potential of the bit line BL is changed. The amount of change in potential of the bit line BL varies depending on the potential of the first terminal of the capacitor 4254 (or the charge accumulated in the capacitor 4254).

For example, the potential of the bit line BL after charge redistribution is $(C_B \times V_{B0} + C \times V)/(C_B + C)$, where V is the potential of the first terminal of the capacitor 4254, C is the capacitance of the capacitor 4254, $C_B$ is the capacitance of the bit line BL (hereinafter also referred to as bit line capacitance), and $V_{B0}$ is the potential of the bit line BL before the charge redistribution. Therefore, it can be found that assuming that the memory cell 4250 is in either of two states in which the potentials of the first terminal of the capacitor 4254 are $V_1$ and $V_0$ ($V_1 > V_0$), the potential of the bit line BL in the case of holding the potential $V_1$ $(=(C_B \times V_{B0} + C \times V_1)/(C_B + C))$ is higher than the potential of the bit line BL in the case of holding the potential $V_0$ $(=(C_B \times V_{B0} + C \times V_0)/(C_B + C))$.

Then, by comparing the potential of the bit line BL with a predetermined potential, data can be read.

As described above, the memory device illustrated in FIG. 7 can hold charge that is accumulated in the capacitor 4254 for a long time because the off-state current of the transistor 4100 is extremely small. In other words, refresh operation becomes unnecessary or the frequency of the refresh operation can be extremely lowered, which leads to a sufficient reduction in power consumption. That is, the memory device described in this embodiment can be substantially used as a nonvolatile memory.

It is preferable that a semiconductor material of the transistor provided in the peripheral circuit for driving the transistor 4100 be different from that of the transistor 4100. For example, silicon, germanium, silicon germanium, silicon carbide, gallium arsenide, or the like can be used, and a single crystal semiconductor is preferably used. Alternatively, an organic semiconductor material or the like may be used. A transistor including such a semiconductor material can operate at sufficiently high speed. Thus, the transistor enables a variety of circuits (e.g., a logic circuit and a driver circuit) which need to operate at high speed to be favorably obtained.

The transistor 4100 is formed using an oxide semiconductor. Since the off-state current of the transistor including an oxide semiconductor is small, stored data can be held for a long time. In other words, the frequency of refresh operation can be extremely lowered, which leads to a sufficient reduction in power consumption.

A memory device having a higher integration can be obtained by stacking both a peripheral circuit including the transistor including a material other than an oxide semiconductor (in other words, a transistor capable of operating at sufficiently high speed) and a memory circuit including the transistor including an oxide semiconductor (in a broader sense, a transistor whose amount of off-state current is sufficiently small).

This embodiment can be implemented in appropriate combination with any of the structures described in the other embodiments.

(Embodiment 5)

The semiconductor device of one embodiment of the present invention can be used for display devices, personal computers, image reproducing devices provided with recording media, and the like. Other examples of electronic devices that can include the semiconductor device according to one embodiment of the present invention are mobile phones, game machines including portable game machines, personal digital assistants, e-book readers, video cameras, digital still cameras, goggle-type displays (head mounted displays), navigation systems, audio reproducing devices (e.g., car audio systems and digital audio players), copiers, facsimiles, printers, multifunction printers, automated teller machines (ATM), and vending machines. FIGS. 8A to 8F illustrate specific examples of these electronic devices.

Figure 8A:
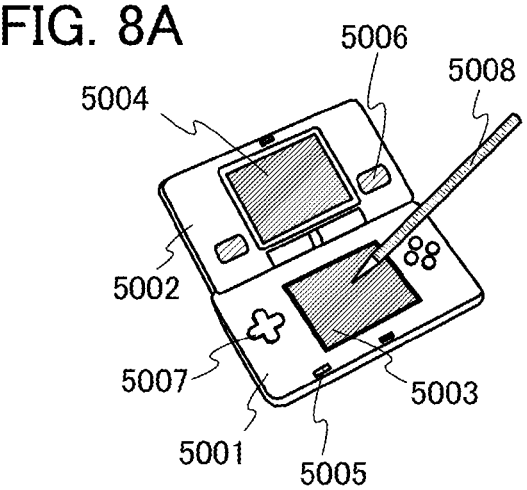
FIGS. 8A to 8F each illustrate an electronic device.

FIG. 8A illustrates a portable game machine, which includes a housing 5001, a housing 5002, a display portion 5003, a display portion 5004, a microphone 5005, speakers 5006, an operation key 5007, a stylus 5008, and the like. Note that although the portable game machine in FIG. 8A includes the two display portions 5003 and 5004, the number of display portions included in the portable game machine is not limited to two.

Figure 8B:
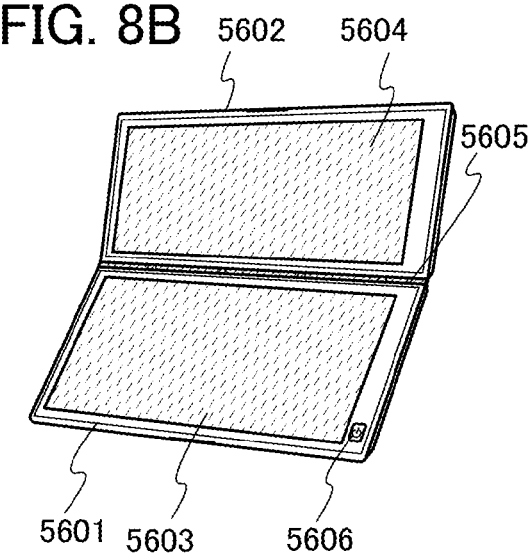

FIG. 8B illustrates a personal digital assistant, which includes a first housing 5601, a second housing 5602, a first display portion 5603, a second display portion 5604, a joint 5605, an operation key 5606, and the like. The first display portion 5603 is provided in the first housing 5601, and the second display portion 5604 is provided in the second housing 5602. The first housing 5601 and the second housing 5602 are connected to each other with the joint 5605, and an angle between the first housing 5601 and the second housing 5602 can be changed with the joint 5605. An image on the first display portion 5603 may be switched depending on the angle between the first housing 5601 and the second housing 5602 at the joint 5605. A display device with a position input function may be used as at least one of the first display portion 5603 and the second display portion 5604. Note that the position input function can be added by provision of a touch panel in a display device. Alternatively, the position input function can be added by provision of a photoelectric conversion element called a photosensor in a pixel area of a display device.

Figure 8C:
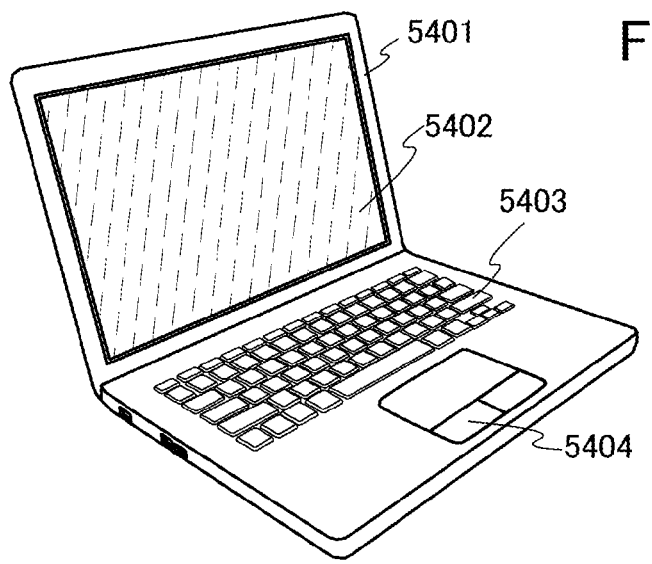

FIG. 8C illustrates a notebook personal computer, which includes a housing 5401, a display portion 5402, a keyboard 5403, a pointing device 5404, and the like.

Figure 8D:
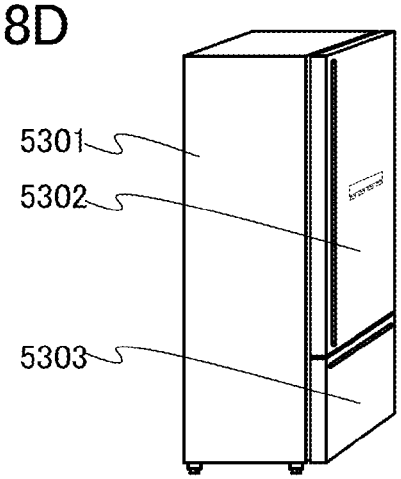

FIG. 8D illustrates an electric refrigerator-freezer, which includes a housing 5301, a door for a refrigerator 5302, a door for a freezer 5303, and the like.

Figure 8E:
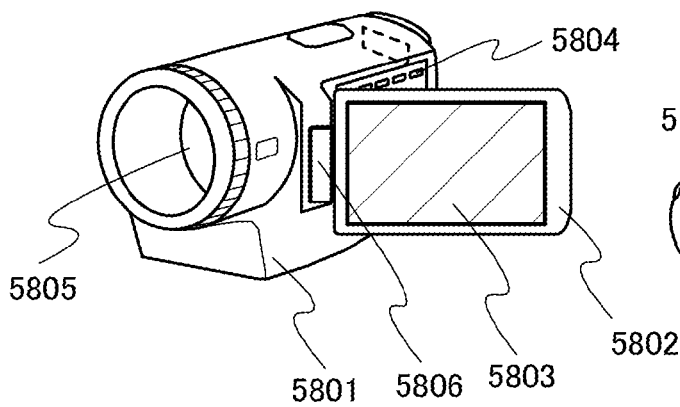

FIG. 8E illustrates a video camera, which includes a first housing 5801, a second housing 5802, a display portion 5803, operation keys 5804, a lens 5805, a joint 5806, and the like. The operation keys 5804 and the lens 5805 are provided in the first housing 5801, and the display portion 5803 is provided in the second housing 5802. The first housing 5801 and the second housing 5802 are connected to each other with the joint 5806, and an angle between the first housing 5801 and the second housing 5802 can be changed with the joint 5806. An image on the display portion 5803 may be switched depending on the angle between the first housing 5801 and the second housing 5802 at the joint 5806.

Figure 8F:
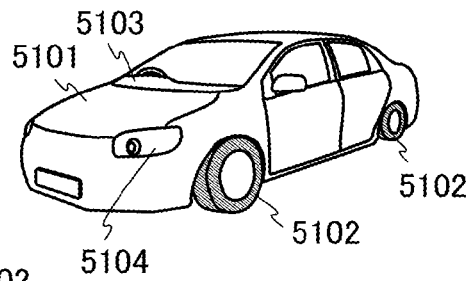

FIG. 8F illustrates an ordinary motor vehicle, which includes a car body 5101, wheels 5102, a dashboard 5103, lights 5104, and the like.

By using the semiconductor device of one embodiment of the present invention for the above electronic devices, power consumption of the electronic devices can be reduced.

This embodiment can be implemented in appropriate combination with any of the structures described in the other embodiments.

This application is based on Japanese Patent Application serial no. 2012-105114 filed with Japan Patent Office on May 2, 2012, the entire contents of which are hereby incorporated by reference.

What is claimed is:

1. A semiconductor device comprising:
   a processor comprising a control device and an arithmetic unit;
   a plurality of bus lines electrically connected to the processor, each of the plurality of bus lines provided with a first memory comprising a first transistor comprising a first oxide semiconductor layer in which a channel region is formed; and
   a second memory electrically connected to the control device,
   wherein information being in one of the plurality of bus lines is stored in the first memory which is electrically connected to the one of the plurality of bus lines, and
   wherein a status flag relating to the information is stored in the second memory.

2. The semiconductor device according to claim 1, wherein the plurality of bus lines include an address bus, a data bus, or an input/output bus.

3. The semiconductor device according to claim 1, wherein the first oxide semiconductor layer comprises In, Ga, and Zn.

4. The semiconductor device according to claim 1, further comprising a capacitor and a bit line,
   wherein a source of the first transistor is electrically connected to the bit line,
   wherein the bit line is electrically connected to one of the plurality of bus lines, and
   wherein a drain of the first transistor is electrically connected to the capacitor.

5. An electronic device comprising the semiconductor device according to claim 1.

6. A semiconductor device comprising:
   a processor comprising a control device and an arithmetic unit;
   a memory device;
   an input/output device; and
   a plurality of bus lines electrically connected to the processor, the memory device, and the input/output device,
   wherein each of the plurality of bus lines is provided with a first memory,
   wherein information being in one of the plurality of bus lines is stored in the first memory which is connected to the one of the plurality of bus lines, and
   wherein a second memory in which a status flag relating to the information is stored is electrically connected to the control device.

7. The semiconductor device according to claim 6, wherein the plurality of bus lines include an address bus, a data bus, or an input/output bus.

8. The semiconductor device according to claim 6, wherein the first memory comprises a first transistor comprising a first oxide semiconductor layer in which a channel region is formed.

9. The semiconductor device according to claim 6, wherein the second memory comprises a second transistor comprising a second oxide semiconductor layer in which a channel region is formed.

10. The semiconductor device according to claim 8, wherein the first oxide semiconductor layer comprises In, Ga, and Zn.

11. The semiconductor device according to claim 8, further comprising a capacitor and a bit line,
    wherein a source of the first transistor is electrically connected to the bit line,
    wherein the bit line is electrically connected to one of the plurality of bus lines, and
    wherein a drain of the first transistor is electrically connected to the capacitor.

12. An electronic device comprising the semiconductor device according to claim 6.

13. A semiconductor device comprising:
    a processor comprising a control device and an arithmetic unit;
    a first bus line electrically connected to the processor, the first bus line provided with a first memory;
    a second bus line electrically connected to the processor, the second bus line provided with a second memory;
    a third bus line electrically connected to the processor, the third bus line provided with a third memory; and
    a fourth memory electrically connected to the control device,
    wherein information being in the first bus line is stored in the first memory, and
    wherein a status flag relating to the information is stored in the fourth memory.

14. The semiconductor device according to claim 13, wherein the first memory comprises a first transistor comprising a first oxide semiconductor layer in which a channel region is formed.

15. The semiconductor device according to claim 13, wherein the second memory comprises a second transistor comprising a second oxide semiconductor layer in which a channel region is formed.

16. The semiconductor device according to claim 13, wherein the third memory comprises a third transistor comprising a third oxide semiconductor layer in which a channel region is formed.

17. The semiconductor device according to claim 13, wherein the fourth memory comprises a fourth transistor comprising a fourth oxide semiconductor layer in which a channel region is formed.

18. The semiconductor device according to claim 13,
    wherein the first bus line is an address bus,
    wherein the second bus line is a data bus, and
    wherein the third bus line is an input/output bus.

19. The semiconductor device according to claim 13, further comprising a capacitor and a bit line,
    wherein a source of the first transistor is electrically connected to the bit line,
    wherein the bit line is electrically connected to one of the first to third bus lines, and
    wherein a drain of the first transistor is electrically connected to the capacitor.

20. An electronic device comprising the semiconductor device according to claim 13.

* * * * *